United States Patent
Song

(10) Patent No.: US 9,440,518 B2
(45) Date of Patent: Sep. 13, 2016

(54) LIGHTING SYSTEM FOR A VEHICLE

(71) Applicant: SAMSUNG ELECTRONICS CO., LTD., Suwon-si, Gyeonggi-do (KR)

(72) Inventor: Su Bin Song, Yongin-si (KR)

(73) Assignee: SAMSUNG ELECTRONICS CO., LTD., Suwon-Si, Gyeongg-Do (KR)

( * ) Notice: Subject to any disclaimer, the term of this patent is extended or adjusted under 35 U.S.C. 154(b) by 225 days.

(21) Appl. No.: 14/459,616

(22) Filed: Aug. 14, 2014

(65) Prior Publication Data
US 2015/0197139 A1    Jul. 16, 2015

(30) Foreign Application Priority Data
Jan. 14, 2014    (KR) .................. 10-2014-0004685

(51) Int. Cl.
| | | |
|---|---|---|
| *B60J 3/04* | (2006.01) | |
| *B60Q 1/14* | (2006.01) | |
| *B60Q 1/00* | (2006.01) | |
| *F21S 8/10* | (2006.01) | |

(52) U.S. Cl.
CPC .............. *B60J 3/04* (2013.01); *B60Q 1/0023* (2013.01); *B60Q 1/1423* (2013.01); *F21S 48/1159* (2013.01); *B60Q 2300/056* (2013.01); *B60Q 2300/314* (2013.01); *F21S 48/325* (2013.01); *F21S 48/328* (2013.01)

(58) Field of Classification Search
CPC ............................... B60J 3/04; B60Q 1/0023
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,280,674 B2 | 10/2007 | Matveev |

(Continued)

FOREIGN PATENT DOCUMENTS

| | | |
|---|---|---|
| JP | 2008-126804 | 6/2008 |
| KR | 1020060002184 | 1/2006 |

(Continued)

*Primary Examiner* — Elmito Breval
(74) *Attorney, Agent, or Firm* — F. Chau & Associates, LLC

(57) ABSTRACT

A lighting system for a vehicle is provided. The lighting system includes a sensor module, a control mode, a shutter glass, and a headlamp module. The sensor module senses light entering from outside of the vehicle to generate a sensing signal. The control module generates shutter and lighting operation signals based on the sensing signal. The shutter glass is opened and closed according to the shutter operation signal. The headlamp module has a light source unit that alternately emits a first light having a first luminance and a second light having a second luminance according to the lighting operation signal. The control module controls the shutter and lighting operation signals to enable the light source unit to alternately emit the first and second lights in synchronization with the opening and closing operations of the shutter glass.

20 Claims, 18 Drawing Sheets

(56) References Cited

U.S. PATENT DOCUMENTS

| | | |
|---|---|---|
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,120,652 B2 | 2/2012 | Bechtel et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,446,550 B2 | 5/2013 | Wen et al. |
| 8,459,832 B2 | 6/2013 | Kim |
| 8,498,779 B2 | 7/2013 | Nakadate |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 2002/0196635 A1* | 12/2002 | DeVolpi ............... B60Q 1/1423 362/464 |
| 2011/0012511 A1* | 1/2011 | Watanabe ............... B60Q 1/085 315/82 |
| 2012/0194657 A1 | 8/2012 | Ko |
| 2012/0242658 A1 | 9/2012 | Lin et al. |
| 2012/0257060 A1 | 10/2012 | Bos et al. |
| 2013/0072828 A1 | 3/2013 | Sweis et al. |

FOREIGN PATENT DOCUMENTS

| | | |
|---|---|---|
| KR | 1020110057616 | 6/2011 |
| KR | 1020110072863 | 6/2011 |

\* cited by examiner

LIGHTING SYSTEM FOR A VEHICLE

CROSS-REFERENCE TO RELATED APPLICATION

This application claims priority under 35 U.S.C. §119 to Korean Patent Application No. 10-2014-0004685, filed on Jan. 14, 2014 in the Korean Intellectual Property Office, the disclosure of which is incorporated by reference herein in its entirety.

TECHNICAL FIELD

The present inventive concept relates to a lighting system for a vehicle.

DISCUSSION OF THE RELATED ART

When driving a vehicle, securing a good field of view (FOV) for a vehicle driver is closely related to safety in driving. In particular, when driving at night, an FOV of the vehicle driver may be obstructed by light emitted from the headlamps of an oncoming vehicle or a vehicle behind the vehicle of which the driver is in control. This may cause an accident.

SUMMARY

According to an exemplary embodiment of the present inventive concept, a lighting system for a vehicle is provided. The lighting system includes a sensor module, a control module, a shutter glass, and a headlamp module. The sensor module is configured to sense light entering from outside of the vehicle to generate a first sensing signal. The control module is configured to generate a shutter operation signal and a lighting operation signal based on the first sensing signal. The shutter glass is configured to be opened and closed according to the shutter operation signal. The headlamp module has a light source unit. The light source unit is configured to alternately emit a first light having a first luminance and a second light having a second luminance according to the lighting operation signal. The control module is configured to control the shutter operation signal and the lighting operation signal to enable the light source unit to alternately emit the first light and the second light in synchronization with the opening and closing operations of the shutter glass.

The control module may include a signal generating unit and a calculation unit. The signal generating unit may be configured to generate the shutter operation signal and the lighting operation signal. The calculation unit may be configured to determine duty cycles and periods of the shutter and lighting operation signals.

The calculation unit may be configured to first determine a value corresponding to an illumination intensity of the sensed light from the first sensing signal, and to second determine the duty cycles and periods of the shutter and lighting operation signals based on the first determination.

The first sensing signal may include a square wave signal corresponding to an illumination intensity of the sensed light.

The shutter operation signal may have a first level for closing the shutter glass when the first sensing signal has a logic high level. The shutter operation signal may have a second level for opening the shutter glass when the first sensing signal has a logic low level.

The calculation unit may be configured to first determine a duty cycle and a period of the first sensing signal, and to second determine the duty cycles and periods of the shutter and lighting operation signals based on the first determination.

The shutter glass may be opened and closed when the shutter operation signal has a logic low level and a logic high level, respectively.

The shutter glass may be closed and opened when the shutter operation signal has a logic low level and a logic high level, respectively.

The light source unit may be configured to emit the first light when the lighting operating signal has a logic low level, and the second light when the lighting operating signal has a logic high level. The second luminance may have a higher value than that of the first luminance.

The determined duty cycles and periods of the shutter and lighting operation signals may be identical to the determined duty cycle and period of the first sensing signal.

The light source unit may be configured to emit the first light when the shutter glass is closed and the second light when the shutter glass is opened. The second luminance having a higher value than that of the first luminance.

The control module may include a calculation unit and a comparing unit. The calculation unit may be configured to determine a value corresponding to an illumination intensity of the sensed light from the first sensing signal. The comparing unit may be configured to compare the determined value of illumination intensity with a reference value. The control module may be configured to generate a shutter operation signal for opening the shutter glass when the value of illumination intensity of the sensed light is equal to or smaller than the reference value.

The shutter glass may be disposed in a portion of a windscreen of the vehicle.

The shutter glass may be disposed in wearable glasses.

The senor module may include first and second sensor units. The first and second sensor units may be configured to sense third and fourth lights, respectively, and to generate second and third sensing signals, respectively based on the third and fourth sensed lights. The first and second sensor units may be disposed in different positions from each other. The second sensing signal having a higher value than that of the third sensing signal may be determined as the first sensing.

According to an exemplary embodiment of the present inventive concept, a lighting system for a vehicle is provided. The lighting system includes a control module, a shutter glass, and a headlamp module. The control module is configured to generate first and second square wave signals synchronized to each other. The shutter glass may be disposed within a field of view of an occupant of the vehicle. The shutter glass may be configured to be opened and closed according to the first square wave signal. The headlamp module has a light source unit. The light source unit is configured to alternately emit a first light having a first luminance and a second light having a second luminance according to the second square wave signal.

The lighting system may further include a sensor module configured to sense light entering from outside of the vehicle to generate a sensing signal, and to output the generated sensing signal to the control module.

The sensing signal may include a third square wave signal having a first duty cycle and a first period, and the first and second square wave signals may be synchronized with the third square wave signal.

According to an exemplary embodiment of the present inventive concept, a lighting system for a vehicle is provided. The lighting system includes a sensor module, a control module, a shutter glass, and a headlamp module. The sensor module includes first and second sensor units. The first sensor unit senses a first light to generate a first sensing signal. The second sensor unit senses a second light to generate a second sensing signal The control module is configured to receive the first and second sensing signals, to determine one sensing signal having a higher illumination intensity than another sensing signal between the first and second sensing signals, and to generate a shutter operation signal and a lighting operation signal based on the one sensing signal having the higher illumination intensity than another sensing signal between the first and second sensing signals. The shutter glass is configured to be opened and closed according to the shutter operation signal. The headlamp module has a light source unit. The light source unit is configured to alternately emit a third light having a first luminance and a fourth light having a second luminance according to the lighting operation signal.

The first light may be a light incident from a front side of the vehicle, and the second light may be a light incident from a rear side of the vehicle.

BRIEF DESCRIPTION OF DRAWINGS

The above and other features of the present inventive concept will become more apparent by describing in detail exemplary embodiments thereof with reference to the accompanying drawings, in which.

DETAILED DESCRIPTION OF THE EMBODIMENTS

Figure 1:
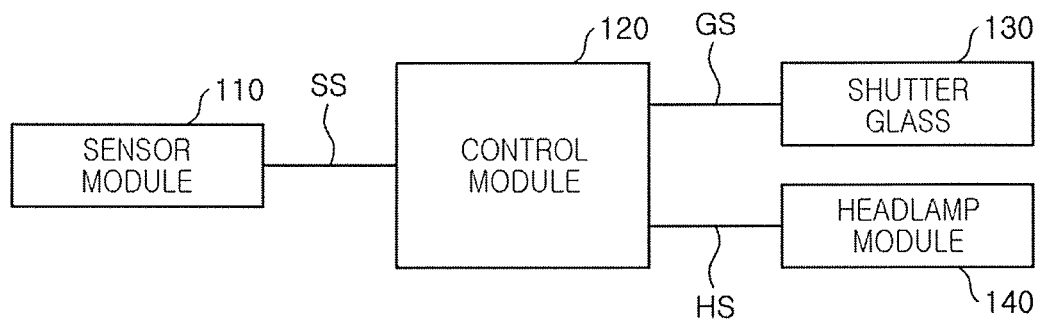
FIG. 1 is a block diagram illustrating a lighting system for a vehicle according to an exemplary embodiment of the present inventive concept.

Hereinafter, exemplary embodiments of the present inventive concept will be described in detail with reference to the accompanying drawings.

The present inventive concept may, however, be embodied in various different forms and should not be construed as being limited to the embodiments set forth herein.

In the drawings, the shapes, dimensions, etc., of elements may be exaggerated for clarity, and the same reference numerals may designate the same or like elements throughout the specification and drawings.

FIG. 1 is a block diagram illustrating a lighting system for a vehicle according to an exemplary embodiment of the present inventive concept.

Referring to FIG. 1, a lighting system for a vehicle according to the present exemplary embodiment includes a sensor module 110 for generating a sensing signal SS, a control module 120 for generating a shutter operation signal GS and a lighting operation signal HS, a shutter glass 130 for repeating opening and closing operations according to the shutter operation signal GS, and a headlamp module 140 having a light source unit for alternately emitting a first light having a first luminance and a second light having a second luminance according to the lighting operation signal HS.

The sensor module 110 senses light incident from the outside of a vehicle and generates the sensing signal SS. The sensing signal SS may include information corresponding to an illumination intensity of the sensed light. The sensor module 110 may include, for example, a light receiving element such as a photodiode, and may be positioned near a visual organ (for example, an eye) of a driver to sense an illumination intensity similar to that felt by the driver from light emitted from a headlamp of an oncoming vehicle or light incident from outside of the vehicle.

The shutter glass 130 may be disposed within a field of view (FOV) of a vehicle occupant, for example, a vehicle driver. The shutter glass 130 may be repeatedly opened and closed to alternately transmit and block light and thus, glare observed by the driver due to light emitted from the headlamp of the oncoming vehicle may be reduced. For example, when the shutter glass 130 is repeatedly opened and closed with a duty cycle of 50% to a particular light having a particular illumination intensity, an average illustration intensity of the particular light recognized by the driver may be half of the particular illumination intensity. The shutter glass 130 may be repeatedly opened and closed, for example, more than 20 times per second such that the driver may not recognize the opening and closing of the shutter glass 130.

The shutter glass 130 may include two transparent conductive films and a liquid crystal layer positioned therebetween. For example, the liquid crystal layer may include a liquid crystal material which may be rotated by the shutter operation signal GS. A shutter of the shutter glass 130 may be opened or closed according to the rotation of the liquid crystal material, but the present inventive concept is not limited thereto. In this case, the shutter operation signal GS may be a first square wave signal having a square waveform, and the shutter glass 130 may be opened when the shutter operation signal GS has a low level, and closed when the shutter operation signal GS has a high level. However, the present inventive concept is not limited thereto, for example, the shutter glass 130 may be closed when the shutter operation signal GS has a low level, and opened when the shutter operation signal GS has a high level.

The headlamp module 140 may have a light source unit, and the light source unit may alternately emit a first light having a first luminance and a second light having a second luminance. The second luminance may have a luminance value greater than that of the first luminance, and the first luminance may include a luminance of 0, which may correspond to a case in which the light source unit is in an OFF state.

The lighting operation signal HS may be used to control the light source unit to alternately emit the first light having the first luminance and the second light having the second luminance, and in this case, the lighting operation signal HS may be a second square wave signal having a square wave form. Here, the light source unit may emit the first light having the first luminance when the lighting operation signal HS has a low level, and the second light having the second luminance when the lighting operation signal HS has a high level. In this case, to facilitate control by the square wave, the light source unit may be implemented by using a light emitting diode (LED). Hereinafter, a detailed exemplary embodiment of the headlamp module 140 will be described with reference to FIG. 11, as well as further components illustrated in FIG. 1.

The control module 120 may generate the shutter operation signal GS and the lighting operation signal HS, and control the shutter operation signal GS and the lighting operation signal HS to enable the light source unit to alternately emit the first light having the first luminance and the second light having the second luminance in synchronization with an opening and closing operation of the shutter glass 130. For example, the control module 120 may control the shutter operation signal GS and the lighting operation signal HS to enable the light source unit to emit the first light having the first luminance when the shutter glass 130 is closed and to emit the second light having the second luminance when the shutter glass 130 is opened. The control module 120 may generate a first square wave signal and a second square wave signal synchronized to each other.

The control module 120 will be described in detail with reference to FIGS. 2 and 3.

Figure 2:
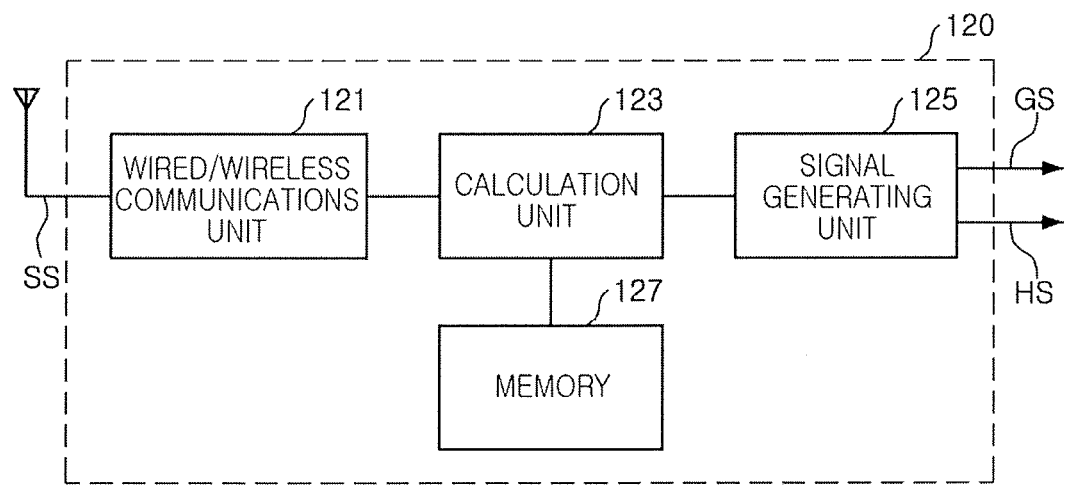
FIG. 2 is a block diagram illustrating a control module in the lighting system for a vehicle according to an exemplary embodiment of the present inventive concept.
Figure 3:
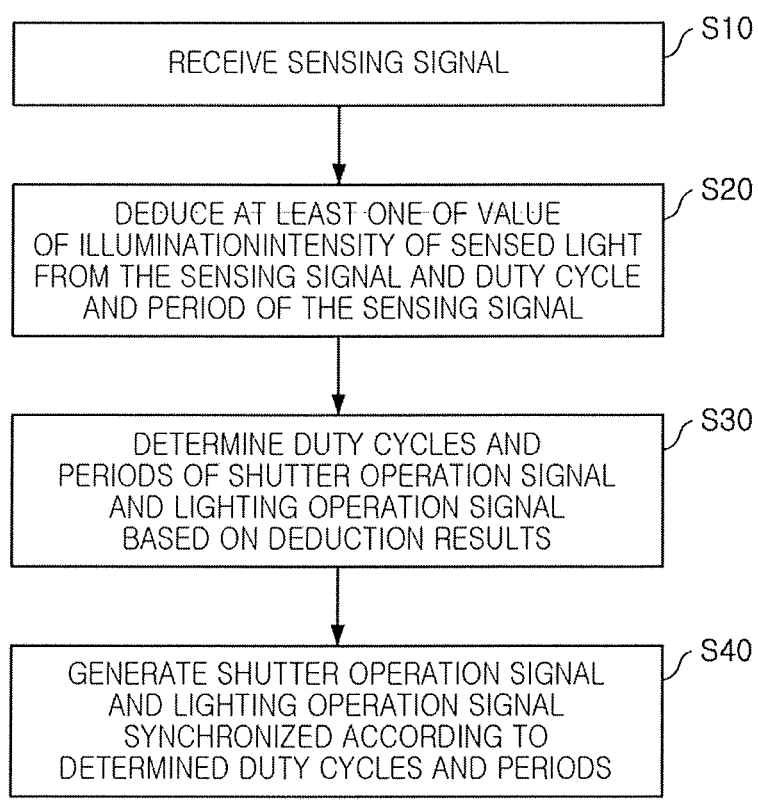
FIG. 3 is a flow chart illustrating an operation of the control module of FIG. 2 according to an exemplary embodiment of the present inventive concept.

FIG. 2 is a block diagram illustrating a control module in the lighting system for a vehicle according to an exemplary embodiment of the present inventive concept.

Referring to FIG. 2, the control module 120 may include a signal generating unit 125 for generating the shutter operation signal GS and the lighting operation signal HS and a calculation unit 123 for determining duty cycles and periods of the shutter operation signal GS and the lighting operation signal HS. The control module 120 may include a wired/wireless communications unit 121 for communicating with the sensor module 110 and may receive the sensing signal SS through the wired/wireless communications unit 121. The wired/wireless communications unit 121 may use a wireless communications scheme. For example, the wired/wireless communications module 121 may use at least one scheme among ZigBee, ultra-wide band (UWB), wireless local area network (WLAN), Bluetooth, infrared data association (IrDA), radio frequency identification (RFID), or the like.

The control module 120 may further include a memory 127 for storing information regarding a user's (e.g., driver's) vehicle. The information regarding the user's vehicle may be, for example, a value of a voltage level, a value of a current level, or the like, that may be represented by the shutter operation signal GS and the lighting operation signal HS.

An operation of the control module 120 will be described with reference to FIGS. 2 and 3. The control module 120 according to an exemplary embodiment of the present inventive concept receives the sensing signal SS through the wired/wireless communications unit 121 (S10). The sensing signal SS may include information corresponding to the illumination intensity of sensed light. The sensing signal SS may be a third square wave signal having a square wave form according to a type of sensed light.

In addition, the calculation unit 123 deduces the information corresponding to the illumination intensity of the sensed light included in the sensing signal SS. The information may be, for example, at least one of the illumination intensity of the sensed light, the duty cycle of the sensing signal SS, the period of the sensing signal SS (S20), or the like. In addition, the calculation unit 123 determines duty cycles and periods of the shutter operation signal GS and the lighting operation signal HS based on the deduction results (S30). In this case, the calculation unit 123 may determine the respective duty cycles and periods of the shutter operation signal GS and the lighting operation signal HS, and thus, the shutter operation signal GS and the lighting operation signal HS are synchronized to each other.

In addition, the signal generating unit 125 may generate the shutter operation signal GS and the lighting operation signal HS synchronized to each other according to the respective duty cycles and periods determined by the calculation unit 123 (S40).

Hereinafter, an operation and an effect of a lighting system for a vehicle according to an exemplary embodiment of the present inventive concept will be described in detail with reference to FIGS. 4 and 5A.

Figure 4:
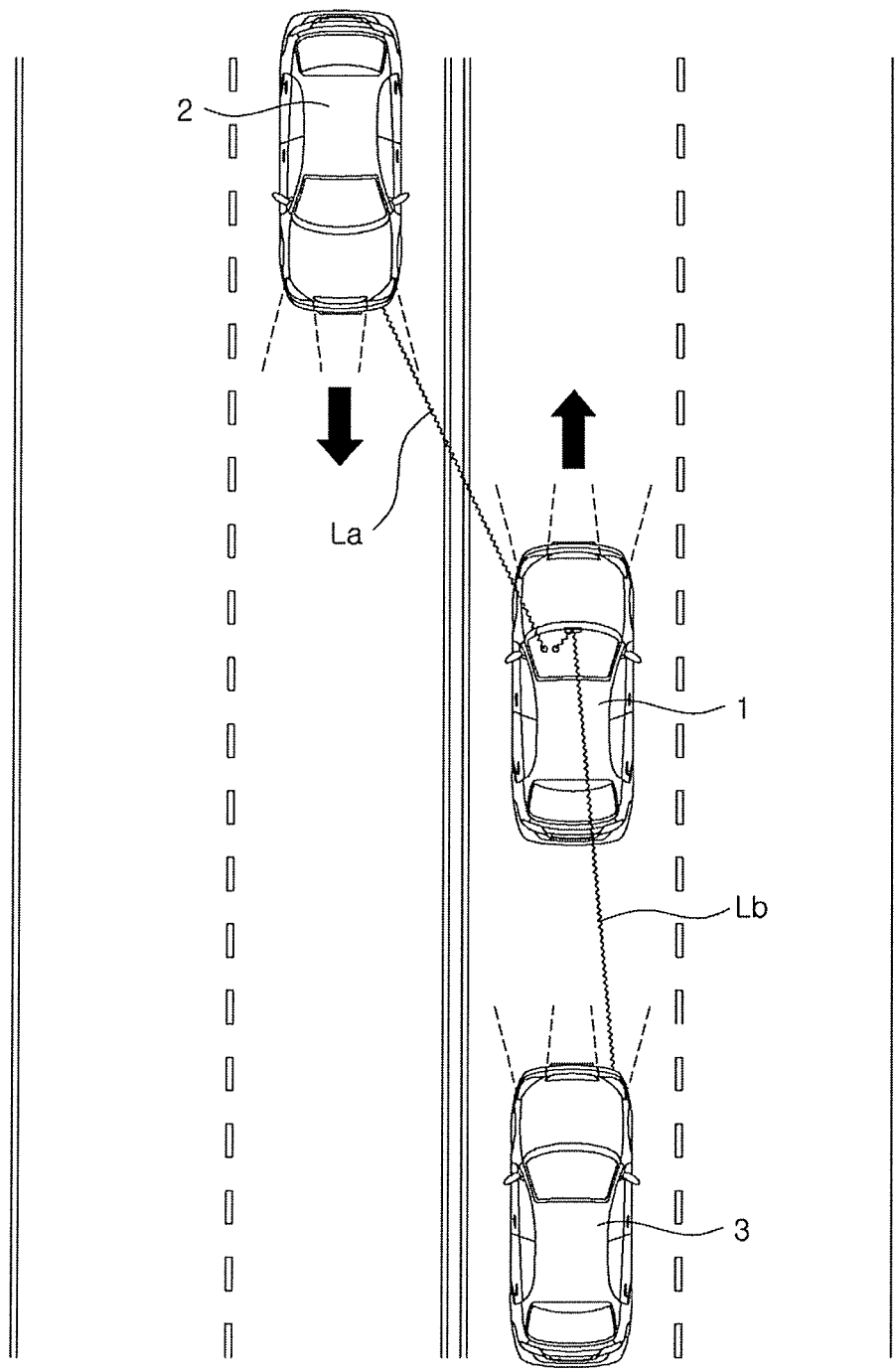
FIG. 4 is a view illustrating an operation of a lighting system for a vehicle according to an exemplary embodiment of the present inventive concept.
Figure 5A:
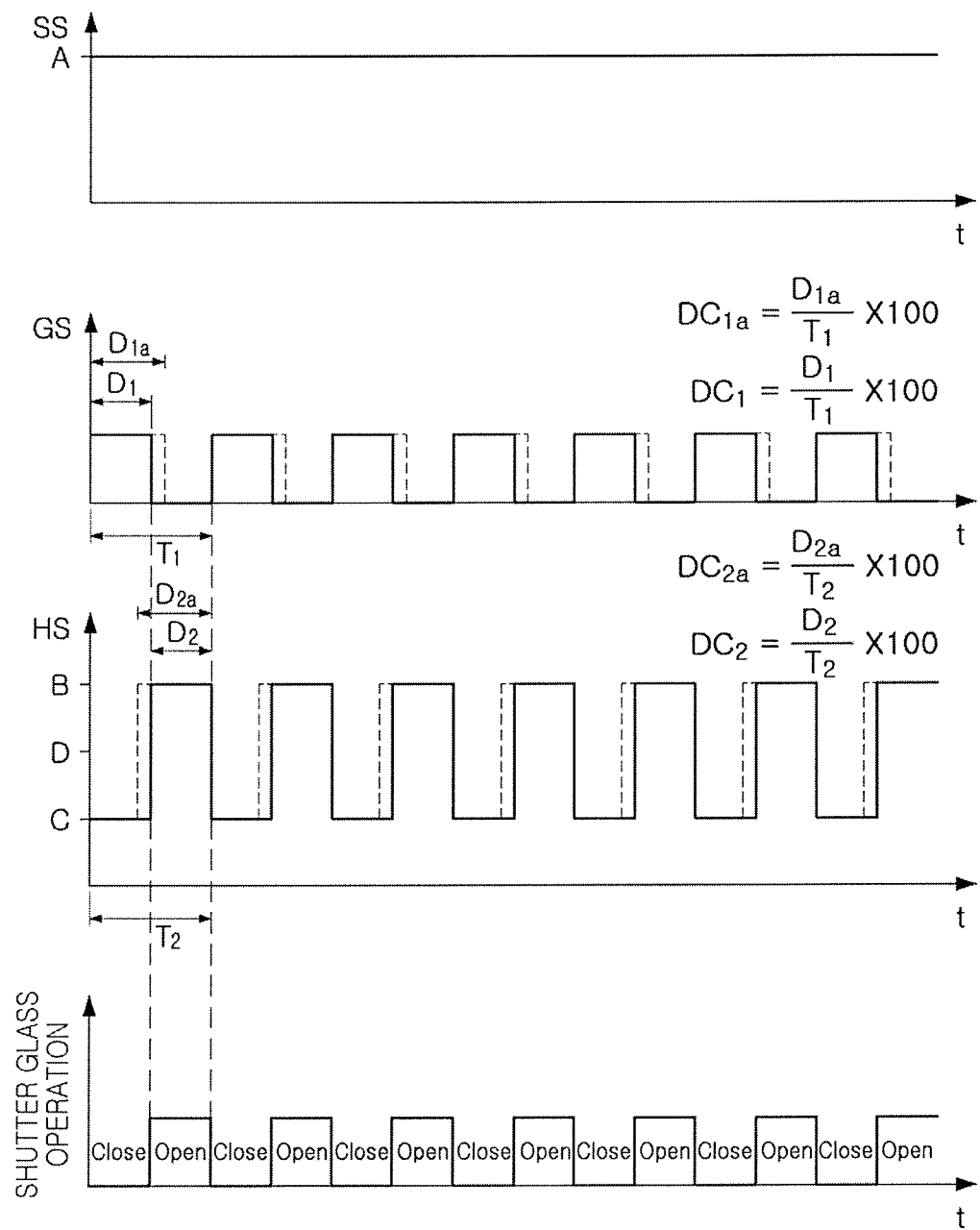
FIGS. 5A through 5B and FIGS. 6A through 6B are views illustrating signal waveforms according to operations of the lighting system for a vehicle according to an exemplary embodiment of the present inventive concept.

FIG. 4 is a view illustrating an operation of a lighting system for a vehicle according to an exemplary embodiment of the present inventive concept, and FIG. 5A is a view illustrating signal waveforms according to operations of the lighting system for a vehicle according to an exemplary embodiment of the present inventive concept.

Referring to FIG. 4, an FOV of a driver of a vehicle 1 may be obstructed by light La emitted from a headlamp of an oncoming vehicle 2 in the opposite lane or light Lb emitted from a headlamp of a vehicle 3 traveling in the same lane behind the vehicle 1. For example, the light Lb may be reflected by a rearview mirror of the vehicle 1. Thus, an accident may occur.

Thus, the lighting system for a vehicle according to an exemplary embodiment of the present inventive concept has the sensor module 110, and the sensor module 110 senses light (e.g., the light La emitted from the headlamp of the oncoming vehicle 2) incident from the outside of the vehicle 1, and generates the sensing signal SS.

According to the exemplary embodiment of the present inventive concept, as illustrated in FIG. 5A, the sensing signal SS may be information corresponding to an illumination intensity of the sensed light. For example, the sensing signal SS may include a value of illumination intensity of the sensed light. Here, the value of illumination intensity may correspond to a magnitude (e.g., an intensity) A of the sensing signal SS.

When the sensing signal SS is generated, the control module 120 receives the sensing signal SS through the wired/wireless communications unit 121, and the calculation unit 123 deduces a value corresponding to an illumination intensity of the sensed light. The control module 120 generates the shutter operation signal GS to reduce glare observed by the driver of the vehicle 1 based on the deduction results.

For example, based on the shutter glass 130 opened when the shutter operation signal GS has a low level and closed when the shutter operation signal GS has a high level, in a case in which the illumination intensity of the sensed light is relatively great, for example, greater than a reference value, the calculation unit 123 determines a duty cycle $DC_1$ and a period $T_1$ of the shutter operation signal GS such that the shutter glass 130 is closed during a relatively long period of time. In this case, the calculation unit 123 may determine the shutter operation signal GS to have a large duty cycle $DC_1$.

In addition, in a case in which the illumination intensity of the sensed light is relatively small, for example, equal to or smaller than the reference value, the calculation unit 123 determines a duty cycle $DC_1$ and a period $T_1$ of the shutter operation signal GS such that the shutter glass 130 is closed during a relatively short period of time. In this case, the calculation unit 123 may determine the shutter operation signal GS to have a small duty cycle $DC_1$.

The control module 120 generates the lighting operation signal HS synchronized with the shutter operation signal GS.

For example, the calculation unit 123 may determine a duty cycle $DC_2$ and a period $T_2$ of the lighting operation signal HS such that the lighting operation signal HS has a high level when the shutter operation signal GS has a low level, and a low level when the shutter operation signal HS has a high level.

Accordingly, when the shutter glass 130 is closed, the light source unit emits the first light having the first luminance, and when the shutter glass 130 is opened, the light source unit emits the second light having the second luminance having a luminance value higher than that of the first luminance.

For example, since the shutter glass 130 alternately transmits and blocks light, the driver of the vehicle 1 is less affected by light La emitted from the headlamp of the oncoming vehicle 2, but, in this case, a rate of recognition of ambient light, as well as the light emitted from the headlamp of the oncoming vehicle 2, may be lowered and thus, an FOV of the driver may become completely. According to an exemplary embodiment of the present inventive concept, since the headlamp module 140 of the vehicle 1 of the driver alternately emits lights (e.g., the first and second lights) having different luminance values in synchronization with the opening and closing operations of the shutter glass 130, and thus, the amount of darkness in the driver's FOV may be may be reduced. For example, the driver's FOV might never be blocked.

In this case, to make light emitted from the headlamp module 140 recognized by the driver of the vehicle 1 as a desired luminance, the second luminance may have a luminance value greater than that of the desired luminance. To this end, for example, when a voltage value for the light source unit to emit light having the desired luminance is D, a voltage value of the high level of the lighting operation signal HS may be a voltage value B greater than the voltage value D. For example, if a particular light having the desired luminance is emitted when a constant voltage (e.g., direct current voltage) of 12V is applied to the light source unit, voltage values corresponding to the low level and high level of the lighting operation signals HS may be 6V and 18V, respectively, and the first light having the first luminance and the second light having the second luminance may be alternately emitted, and thus, the light having the desired luminance may be recognized by the driver of the vehicle 1. However, the present inventive concept is not limited thereto. In this case, to prevent the driver of the vehicle 1 from recognizing flickering, the first light and the second light may be alternately emitted twenty or more times per second.

According to an exemplary embodiment of the present inventive concept, the driver of the vehicle 1 may be less affected by light La emitted from the headlamp of the oncoming vehicle 2 and thus, an appropriate FOV may be achieved based on the headlamp of the vehicle 1.

Although, in the exemplary embodiment of the present inventive concept, as illustrated in FIG. 5A, the shutter operation signal GS and the lighting operation signal HS may be complementary to each other. The present inventive concept is not limited thereto.

For example, in a case in which the calculation unit 123 determines that the magnitude A of the sensing signal SS is greater than a pre-set value, the calculation unit 123 may increase a duty cycle of the shutter operation signal GS. For example, as illustrated in FIG. 5A, the calculation unit 123 may determine that the duty cycle of the shutter operation signal GS should be changed from $DC_1$ to $DC_{1a}$. In this case, the calculation unit 123 may increase a duty cycle of the lighting operation signal HS. For example, the calculation unit 123 may determine that the duty cycle of the lighting operation signal HS should be changed from $DC_2$ to $DC_{2a}$. Accordingly, the shutter operation signal GS and the lighting operation signal HS may not be complementary to each other. For example, time durations D at high levels of the shutter operation signal GS and the lighting operation signal HS may partially overlap each other.

Thus, the control module 120 may synchronize the shutter operation signal GS and the lighting operation signal HS, and when the control module 120 determines that the driver of the vehicle 1 suffers a large amount of glare, the control module 120 may increase the duty cycle (e.g., from $DC_1$ to $DC_{1a}$) of the shutter operation signal GS to increase an CLOSED time of the shutter glass 130, and thus, glare observed by the driver of the vehicle 1 may be reduced.

Here, in response to the relatively increased CLOSED time of the shutter glass 130, the control module 120 may increase the duty cycle (e.g., from $DC_2$ to $DC_{2a}$) of the lighting operation signal HS to secure an appropriate FOV based on the headlamp of the vehicle 1 of the driver.

Figure 5B:
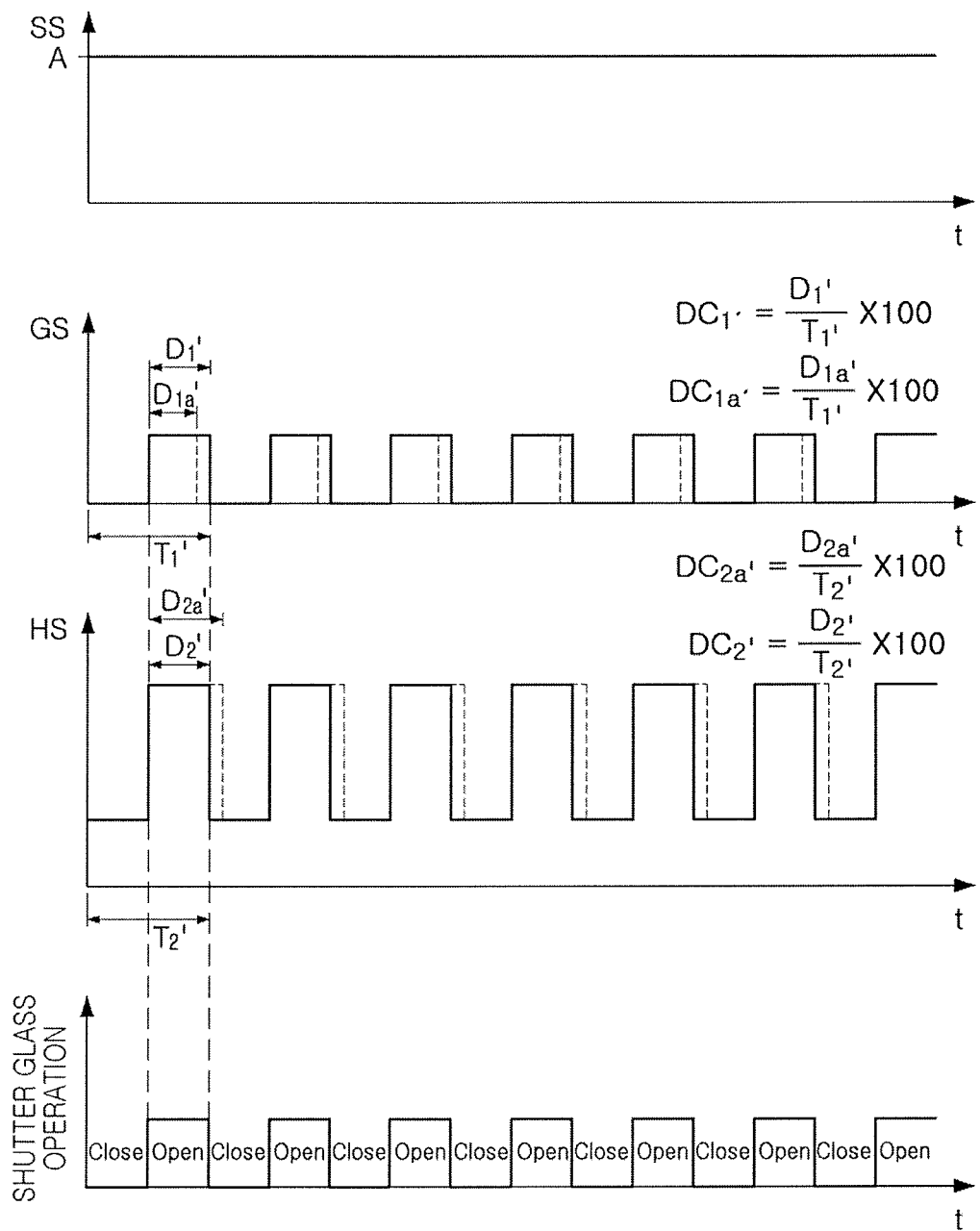

FIG. 5B is a view illustrating signal waveforms according to operations of the lighting system for a vehicle according to an exemplary embodiment of the present inventive concept.

The exemplary embodiment illustrated in FIG. 5B is identical to that of FIG. 5A, except that a shutter glass 130, which is closed when the shutter operation signal GS has a low level and is opened when the shutter operation signal GS has a high level, is employed.

For example, the calculation unit 123 may set a duty cycle $DC_1'$ of the shutter operation signal GS such that a time duration in which the shutter glass 130 is closed is lengthened when an illumination intensity of the sensed light is relatively great, for example, greater than a reference value. In addition, the calculation unit 123 may set the duty cycle $DC_1'$ of the shutter operation signal GS such that a time duration in which the shutter glass 130 is closed is shortened when an illumination intensity of the sensed light is relatively small, for example, greater than a reference value. For example, the calculation unit 123 may control to change a period $T_1'$ of the shutter operation signal GS, besides the scheme of changing the duty cycle $DC_1'$ In addition, the calculation unit 123 may determine a duty cycle $DC_2'$ and a period $T_2'$ of the lighting operation signal HS such that the lighting operation signal HS has a low level when the shutter operation signal GS has the low level and a high level when the shutter operation signal GS has the high level.

Accordingly, the light source unit may emit a first light having a first luminance when the shutter glass 130 is closed, and emit a second light having a second luminance when the shutter glass 130 is opened, and thus, an appropriate FOV may be provided to the driver of the vehicle 1.

Although, in an exemplary embodiment of the present inventive concept, as illustrated in FIG. 5B, the shutter operation signal GS and the lighting operation signal HS have the same logic level (e.g., the high or low level) at the time as each other, the present inventive concept is not limited thereto.

For example, when a magnitude of the sensing signal SS is greater than a pre-set value, the calculation unit 123 may increase a duty cycle of the shutter operation signal GS. For example, as illustrated in FIG. 5B, the calculation unit 123 may determine that the duty cycle of the shutter operation signal GS should be changed from $DC_1'$ to $DC_{1a}'$. In this case, the calculation unit 123 may increase a duty cycle of the lighting operation signal HS. For example, the calculation unit 123 may determine that the duty cycle of the lighting operation signal HS should be changed from $DC_2'$ to $DC_{2a}'$. Accordingly, the shutter operation signal GS and the lighting operation signal HS may not have the same logic level (e.g., the high or low level) at certain times as each other.

Thus, the control module 120 may synchronize the shutter operation signal GS and the lighting operation signal HS, and when the control module 120 determines that the driver of the vehicle 1 suffers a large amount of glare, the control module 120 may decrease the duty cycle (e.g., from $D_1'$ to $D_{1a}'$) of the shutter operation signal GS to increase an CLOSED time of the shutter glass 130, and thus, glare observed by the driver of the vehicle 1 may be reduced.

Here, in response to the relatively increased CLOSED time of the shutter glass 130, the control module 120 may increase the duty cycle (e.g., from $D_2'$ to $D_{2a}'$) of the lighting operation signal HS to secure an appropriate FOV based on the headlamp of the vehicle 1 of the driver.

Figure 6A:
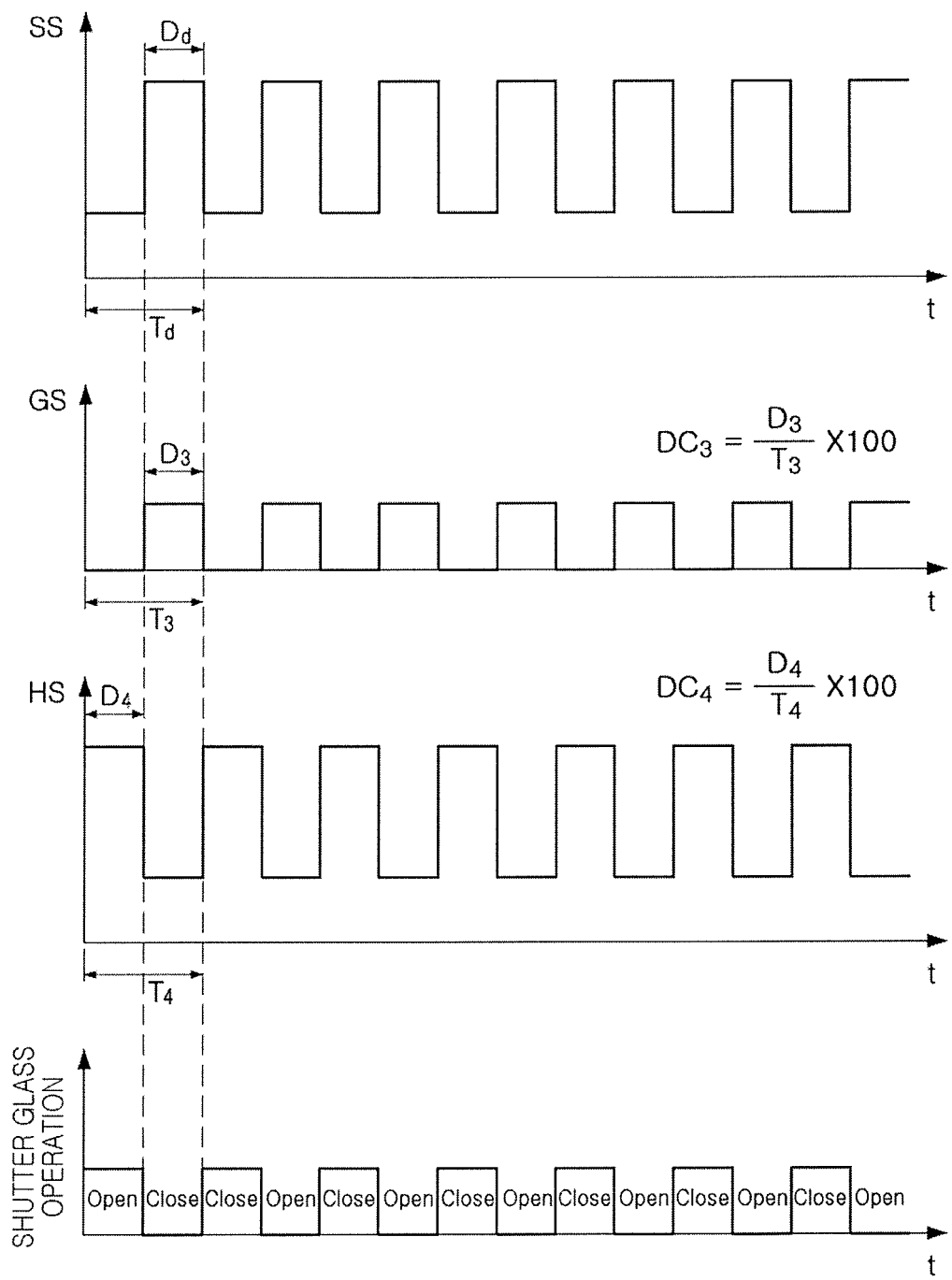

FIG. 6A is a view illustrating signal waveforms according to operations of the lighting system for a vehicle according to an exemplary embodiment of the present inventive concept.

Referring to FIG. 6A, the lighting system for a vehicle according to an exemplary embodiment of the present inventive concept includes the sensor module 110, and the sensor module 110 senses light(e.g., light La emitted from a headlamp of the oncoming vehicle 2) incident from the outside of the vehicle 1 and generates the sensing signal SS.

Referring to FIG. 6A, the sensing signal SS may have a third square wave signal having a square waveform corresponding to an illumination intensity of the sensed light by the sensor module 110. In this case, the sensed light may be alternately emitted lights (e.g., the first and second lights) having different luminance values, and it may also be understood such that, for example, the oncoming vehicle 2 has the headlamp module 140 according to the lighting system for a vehicle according to an exemplary embodiment of the present inventive concept. Thus, the sensing signal SS may have a square form representing a high level when an illumination intensity of the sensed light is relatively high, for example, higher than a reference value, and a low level when an illumination intensity of the sensed light is relatively low, for example, equal to or lower than the reference value.

When the sensing signal SS is generated, the control module 120 receives the sensing signal SS through the wired/wireless communications unit 121, and the calculation unit 123 deduces a duty cycle $DC_d$ and a period $T_d$ of the sensing signal SS, and determines the shutter operation signal GS to reduce glare observed by the driver of the vehicle 1 based on the deduction results.

For example, based on the shutter glass 130, which is opened when the shutter operation signal GS has a low level and is closed, when the shutter operation signal GS has a high level, the calculation unit 123 may determine the shutter operation signal GS to have a duty cycle $DC_3$ and a period $T_3$ identical to those of the sensing signal SS. This may be understood such that the shutter operation signal GS is synchronized with the sensing signal SS.

Accordingly, the signal generating unit 125 generates the shutter operation signal GS for closing the shutter glass 130 when the sensing signal SS has a high level (for example, when an illumination intensity of the sensed light is relatively high). In addition, the signal generating unit 125 generates the shutter operation signal GS for opening the shutter glass 130 when the sensing signal SS has a low level (for example, when an illumination intensity of the sensed light is relatively low). In this case, since the shutter glass 130 alternately transmits and blocks light, the driver of the vehicle 1 may be less affected by light emitted from the headlamp of the oncoming vehicle 2.

In addition, the control module 120 generates a lighting operation signal HS synchronized with the shutter operation signal GS.

In an exemplary embodiment of the present inventive concept, the calculation unit 123 may determine a duty cycle $DC_4$ and a period $T_4$ of the lighting operation signal HS such that the lighting operation signal HS has a high level when the shutter operation signal GS has a low level, and a low level when the shutter operation signal GS has a high level.

This may be understood such that the lighting operation signal HS has a period identical to that of the sensing signal SS, and a waveform complementary to that of the sensing signal SS. Thus, the sensing signal SS, the shutter operation signal GS, and the lighting operation signal HS may be synchronized with each other.

According to an exemplary embodiment of the present inventive concept, since the headlamp module of the vehicle 1 emits lights (e.g., the first and second lights) having different luminance values (for example, the first and second luminance values) alternately in synchronization with opening and closing operations of the shutter glass 130, a degree of darkness impacting the driver's FOV may be minimized in spite of the opening and closing operations of the shutter glass 130.

Figure 6B:
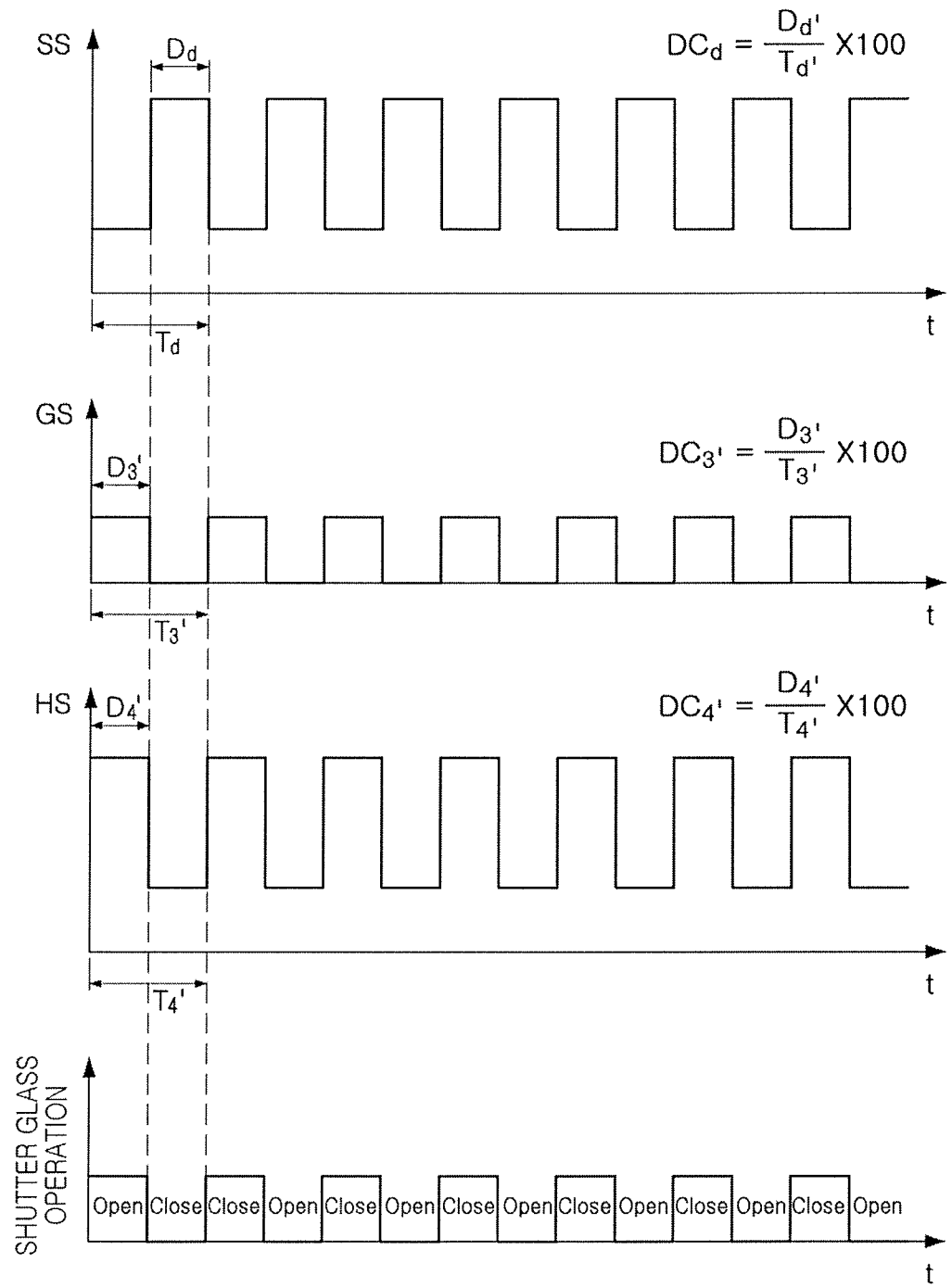

FIG. 6B is a view illustrating signal waveforms according to operations of the lighting system for a vehicle according to an exemplary embodiment of the present inventive.

The exemplary embodiment illustrated in FIG. 6B is identical to that of FIG. 6A, except that a shutter glass 130, which is closed when the shutter operation signal GS has a low level and is opened when the shutter operation signal GS has a high level, is employed.

Referring to FIG. 6B, the calculation unit 123 may deduce a duty cycle $DC_d$ and a period $T_d$ of the sensing signal SS, and determine the shutter operation signal GS to have the same period $T_3'$ and duty cycle $DC_3'$ at a high level as the sensing signal SS based on the deduction result. In addition, the shutter operation signal GS may have a waveform complementary to a waveform of the sensing signals SS. Thus, glare observed by the driver may be minimized.

In addition, the calculation unit 123 may determine the lighting operation signal HS to have the same period $T_4'$ and duty cycle $DC_4'$ as those of the shutter operation signal GS. Thus, an appropriate FOV may be provided to the driver of the vehicle 1.

Figure 7:
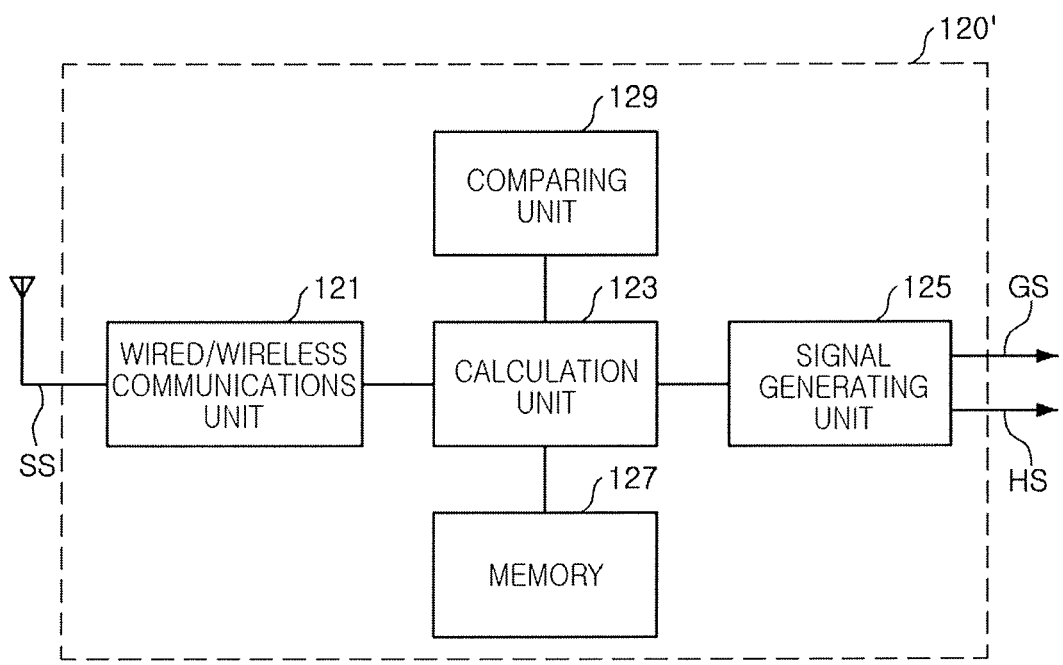
FIG. 7 is a block diagram illustrating a control module in the lighting system for a vehicle according to an exemplary embodiment of the present inventive concept.

FIG. 7 is a block diagram illustrating a control module 120' in the lighting system for a vehicle according to an exemplary embodiment of the present inventive concept.

Referring to FIG. 7, the control module 120' includes a wired/wireless communications unit 121, a calculation unit 123, a memory 127, a signal generating unit 125, and further includes a comparing unit 129, unlike the control module 120 illustrated in FIG. 2. Hereinafter, mostly differences between the control module 120' illustrated in FIG. 7 and the control module 120 illustrated in FIG. 2 will be described.

Referring to FIG. 7, the wired/wireless communications unit 121 may receive a sensing signal SS from the sensor module 110. Here, the sensing signal SS may include information corresponding to an illumination intensity of sensed light, and the calculation unit 123 may deduce the information corresponding to the illumination intensity of the sensed light from the sensing signal SS.

The comparing unit 129 may compare the illumination intensity of the sensed light with a reference value based on the deduced results, and when the illumination intensity of the sensed light is smaller than or equal to the reference value according to the comparison results, the control module 120' may generate the shutter operation signal GS for opening the shutter glass 130.

For example, this may correspond to a case in which the control module 120' may control the shutter glass 130 to be opened, rather than to be repeatedly opened and closed, when an FOV of the driver is not greatly obstructed by the headlamp of the oncoming vehicle 2, or the like.

Figure 8:
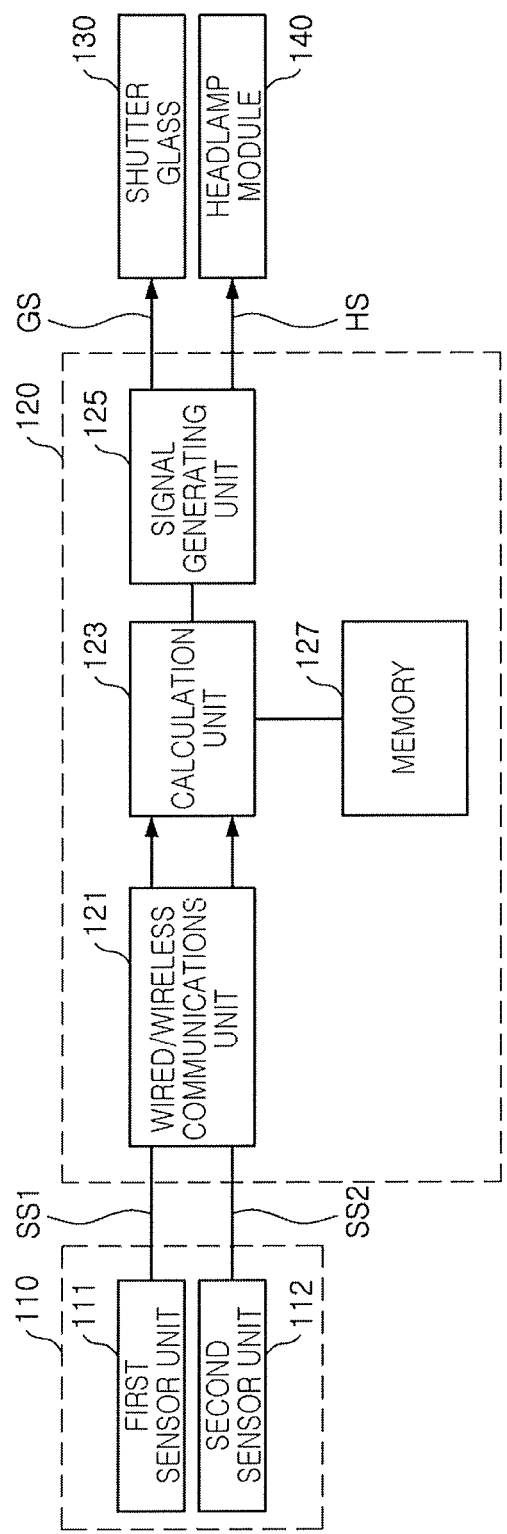
FIG. 8 is a block diagram illustrating a lighting system for a vehicle according to an exemplary embodiment of FIG. 1.
Figure 9:
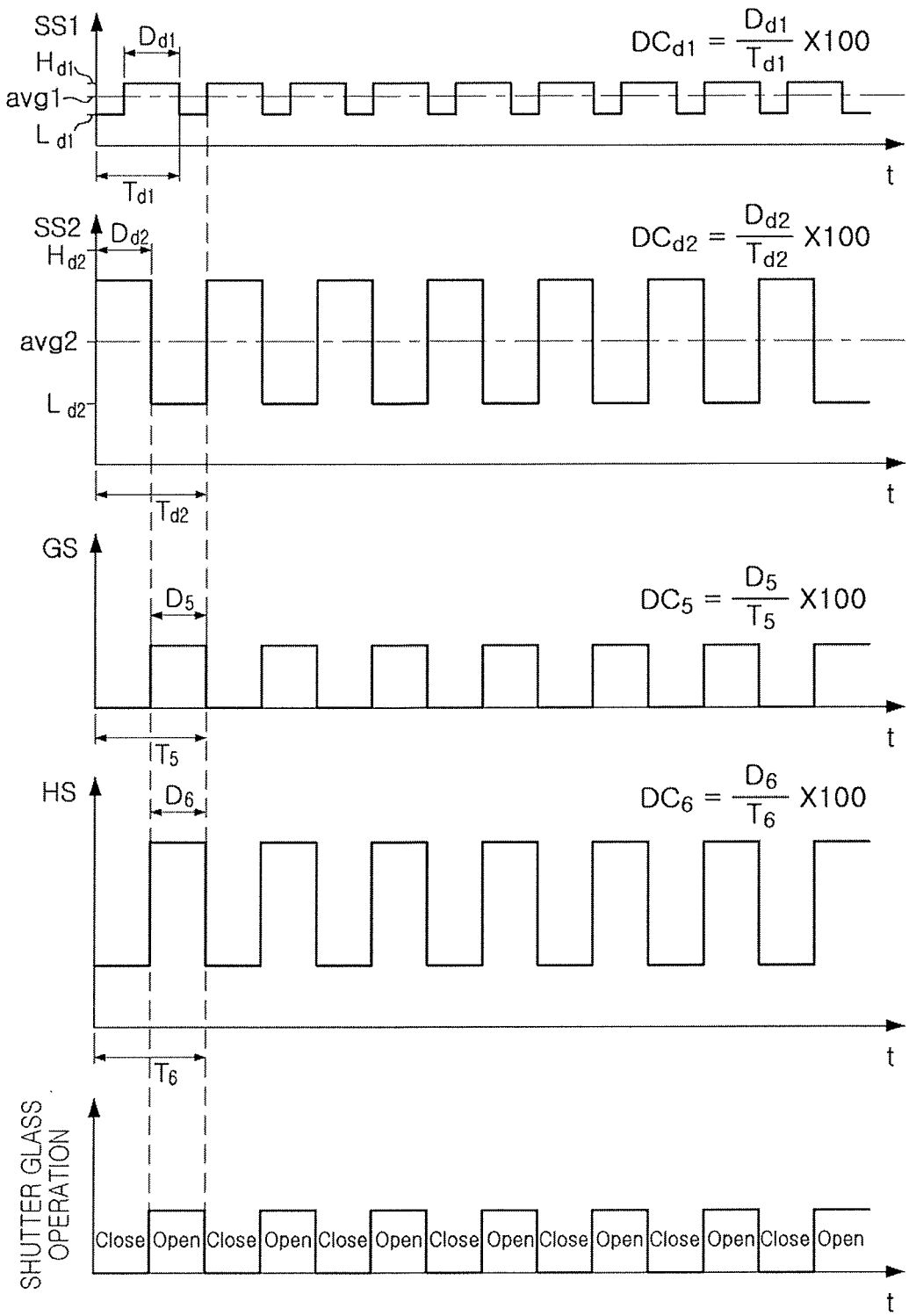
FIG. 9 is a view illustrating signal waveforms according to operations of the lighting system for a vehicle according to an exemplary embodiment of FIG. 8.

FIG. 8 is a block diagram illustrating a lighting system for a vehicle according to an exemplary embodiment of the present inventive concept, and FIG. 9 is a view illustrating signal waveforms, according to operations of the lighting system for a vehicle, according to an exemplary embodiment of FIG. 8.

Referring to FIG. 8, the lighting system for a vehicle according to an exemplary embodiment of the present inventive concept includes a sensor module 110, a control module 120, a headlamp module 140, and a shutter glass 130. Hereinafter, mostly differences between the lighting system illustrated in FIG. 8 and the lighting system illustrated in FIG. 1 will be mainly described.

Referring to FIG. 8, the sensor module 110 may include a first sensor unit 111 and a second sensor unit 112. The first and second sensor units 111 and 112 may respectively sense light incident from the outside of a vehicle and generate first and second sensing signals SS1 and SS2.

The first and second sensor units 111 and 112 may be disposed in different positions from each other. For example, the first sensor unit 111 may be disposed at the left of the vehicle and the second sensor unit 112 may be disposed at the right of the vehicle.

In addition, for example, the first sensor unit 111 may be disposed to sense light incident from the front side of the vehicle, and the second sensor unit 112 may be disposed in a region adjacent to a rearview mirror of the vehicle to sense light which is incident from the rear side of the vehicle and is reflected through the rearview mirror. In this case, for example, the first sensing signal SS1 may be a signal corresponding to an illumination intensity of light La emitted from a headlamp of the oncoming vehicle 2 in the opposite lane, and the second sensing signal SS may be a signal corresponding to an illumination intensity of light Lb emitted from a headlamp of the vehicle 3 behind the vehicle 1.

Hereinafter, an example of operating the lighting system for a vehicle of FIG. 8 will be described with reference to FIG. 9.

Referring to FIG. 9, the first and second sensing signals SS1 and SS2 may be square wave signals respectively having predetermined duty cycles $DC_{d1}$ and $DC_{d2}$ at a high level and periods $T_{d1}$ and $T_{d2}$.

The calculation unit 123 may receive the first and second sensing signals SS1 and SS2 and determine which of the first and second sensing signals SS1 and SS2 has an illumination intensity that obstructs the FOV of the driver of the vehicle 1.

Referring to FIG. 9, the calculation unit 123 may compare magnitudes of high levels $H_{d1}$ and $H_{d2}$ of the respective first and second sensing signals SS1 and SS2, and determine a signal (for example, the first sensing signal SS1 or the second sensing signal SS2) having a greater magnitude as the signal obstructing the FOV of the driver of the vehicle 1.

In an exemplary embodiment of the present inventive concept, the calculation unit 123 may deduce average values avg1 and avg2, respectively, using magnitudes of the high levels $H_{d1}$ and $H_{d2}$ and low levels $L_{d1}$ and $L_{d2}$ of the first and second sensing signals SS1 and SS2, compare the average values avg1 and avg2 with each other, and determine which of the first and second sensing signals SS1 and SS2 has a greater average value than the other one. For example, the averaged value avg2 deduced from the second sensing signal SS2 may be greater than the averaged value avg1 deduced from the first sensing signal SS1, and thus, the second sensing signal SS may be a signal obstructing an FOV of the driver of the vehicle 1.

In addition, the calculation unit 123 may determine duty cycles and periods of the shutter operation signal GS and the lighting operation signal HS such that the shutter glass 130 is opened and closed in response to the second sensing signal SS2 determined to obstruct the FOV of the driver of vehicle 1.

For example, the calculation unit 123 may determine duty cycles $DC_5$ and $DC_6$ and periods $T_5$ and $T_6$ of the shutter operation signal GS and the lighting operation signal HS to be the same as a duty cycle $DC_{d2}$ and a period $T_{d2}$ of the second sensing signal SS2. Accordingly, the shutter glass 130 may repeatedly be opened and closed to reduce obstruction to the FOV of the driver. In addition, the light source unit of the headlamp module 140 may alternately emit a first light having a first luminance and a second light having a second luminance in synchronization with the opening and closing operations of the shutter glass 130, and a better FOV for the driver of the vehicle 1 may be achieved.

Figure 10:
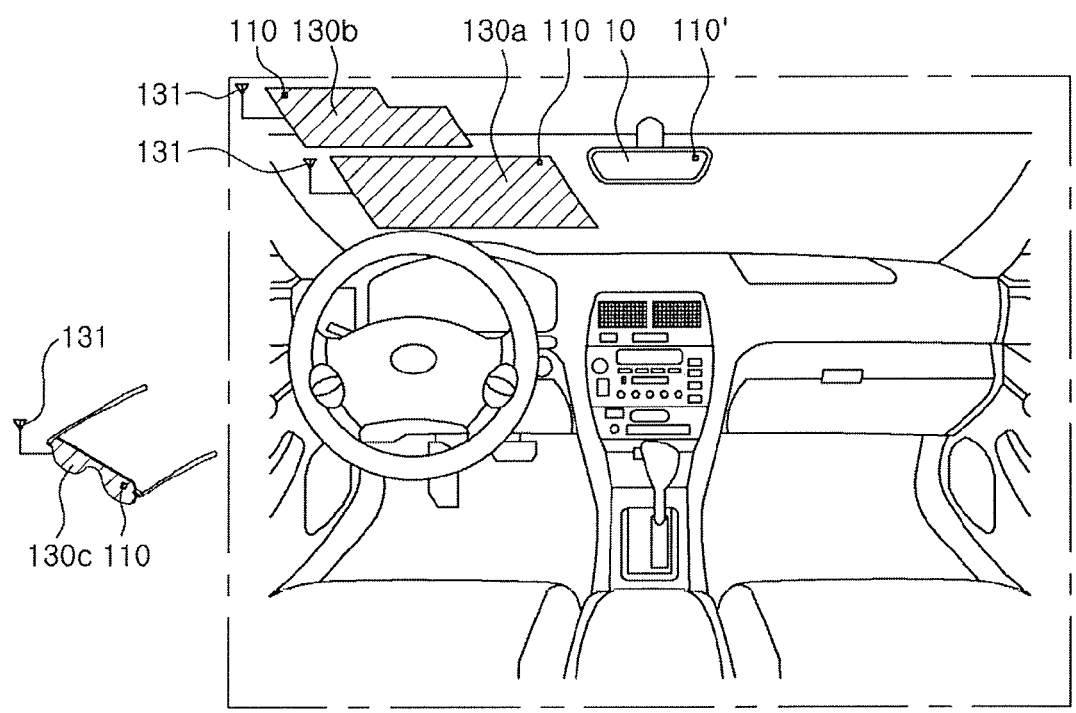
FIG. 10 is a view illustrating an interior of a vehicle including a lighting system according to an exemplary embodiment of the present inventive concept.

FIG. 10 is a view illustrating an interior of a vehicle including a lighting system according to an exemplary embodiment of the present inventive concept.

Referring to FIG. 10, a shutter glass of the lighting system for a vehicle according to the present exemplary embodiment may be disposed within an FOV of an occupant, for example, a driver, of the vehicle 1. For example, a shutter glass 130a according to an exemplary embodiment of the present inventive concept may be disposed on a windshield of the vehicle 1. A shutter glass 130*b* according to an exemplary embodiment of the present inventive concept may be disposed on a sun visor attached to the ceiling above a driver's seat. However, the present inventive concept is not limited thereto. For example, a shutter glass 130*c* may be provided as wearable glasses that the occupant of the vehicle 1 may wear.

In addition, the shutter glasses 130*a*, 130*b*, and 130*c* may include a wireless communications unit 131 for communicating with the control module 120. The wireless communications unit 131 may receive the shutter operation signal GS from the control module 120 using at least one scheme among ZigBee, UWB, WLAN, Bluetooth, IrDA, RFID, or the like.

Referring to FIG. 10, the sensor module 110 may be positioned near a visual organ (e.g., an eye) of a driver to sense an illumination intensity similar to that felt by the driver from light La emitted from a headlamp of an oncoming vehicle 2 or light incident from outside of the vehicle 1. For example, as illustrated in FIG. 10, the sensor module 110 may be installed within each of the shutter glasses 130*a*, 130*b*, and 130*c*.

In addition, to determine whether the FOV of the driver of the vehicle 1 is obstructed by the light Lb, which is emitted from the headlamp of the vehicle 2 behind the vehicle 1 and reflected by a rearview mirror 10 of the vehicle 1, an additional sensor module 110' may be disposed in a region adjacent to the rearview mirror 10 of the vehicle 1.

Figure 11:
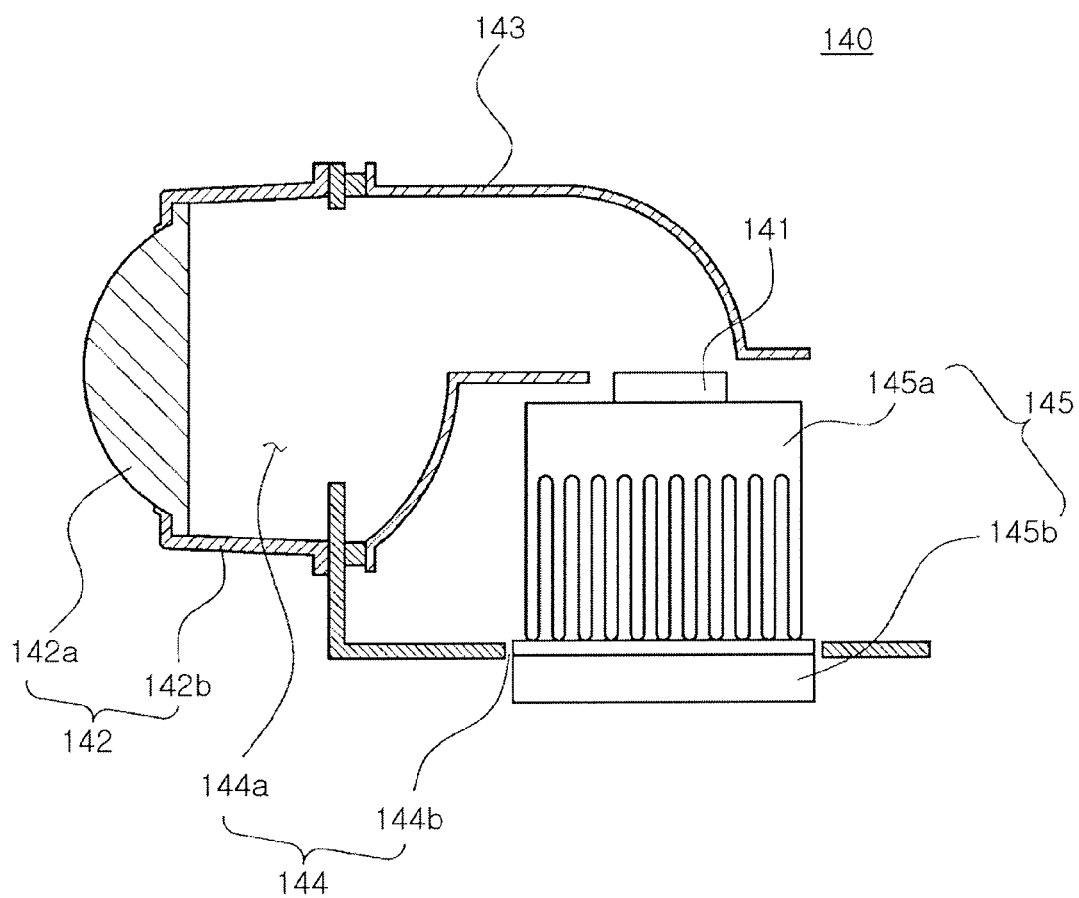
FIG. 11 is a cross-sectional view illustrating a headlamp module of a lighting system for a vehicle according to an exemplary embodiment of the present inventive concept.

FIG. 11 is a cross-sectional view illustrating a headlamp module 140 of a lighting system for a vehicle according to an exemplary embodiment of the present inventive concept.

Referring to FIG. 11, a headlamp module 140 may include a light source unit 141, a reflective unit 143, and a lens cover unit 142. The lens cover unit 142 may include a hollow guide 142b and a lens 142a. The headlamp module 140 may further include a heat dissipation unit 145 for dissipating heat generated by the light source unit 141 to the outside of the headlamp module 140. To dissipate the heat, the heat dissipation unit 145 may include a heat sink 145*a* and a cooling fan 145*b*. In addition, the head lamp module 140 may further include a housing 144 for fixedly supporting the heat dissipation unit 145 and the reflective unit 143, and the housing 144 may have a central hole 144*b* formed in one surface thereof, in which the heat dissipation unit 145 is coupled. The housing 144 may have a front hole 144*a* formed on the other surface which is integrally connected to the one surface and bent at a right angle. The front hole 144*a* may allow the reflective unit 143 to be fixedly positioned above the light source unit 141. Accordingly, a front side is opened by the reflective unit 143, and the reflective unit 143 is fixed to the housing 144 such that the opened front side corresponds to the front hole 144*a*, and light reflected by the reflective unit 143 may pass through the front hole 144*a* to be output outwardly. In an exemplary embodiment of the present inventive concept, the light source unit 141 may be implemented using at least one LED, and in this case, the light source 141 may emit a first light having a first luminance and a second light having a second luminance alternately in response to a lighting operation signal HS having a square form applied thereto Hereinafter, an LED in a headlamp module according to an exemplary embodiment of the present inventive concept will be described with reference to FIGS. 12 through 16.

Figure 12:
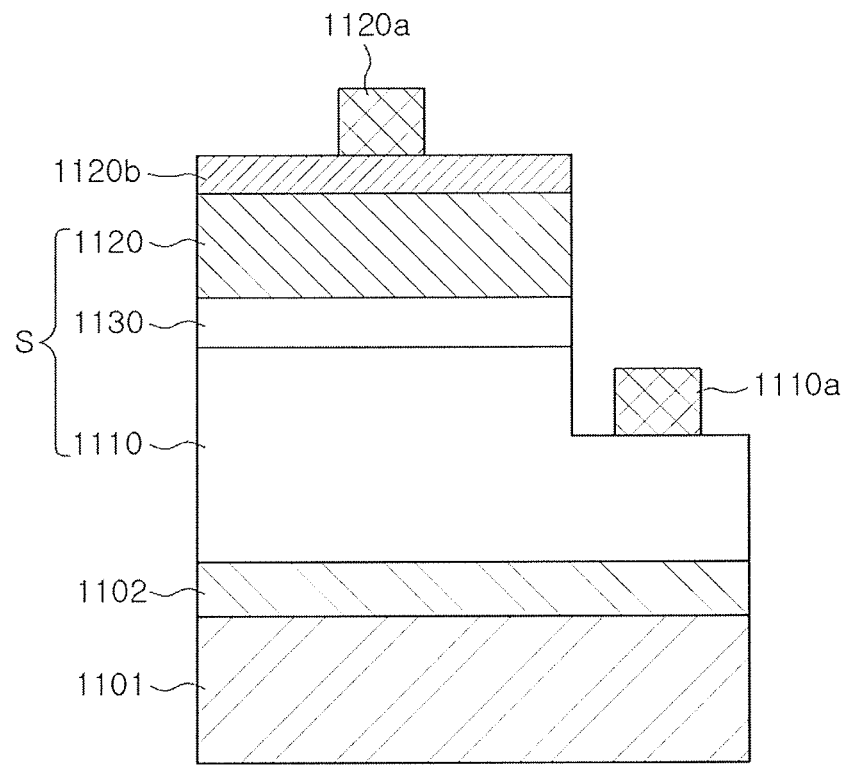
FIGS. 12, 13, 14, 15A-15E and 16 are views illustrating a light emitting diode (LED) in a headlamp module according to an exemplary embodiment of the present inventive concept.

Referring to FIG. 12, an LED according to an exemplary embodiment of the present inventive concept may be provided as an LED chip including a light emitting laminate S formed on a semiconductor substrate 1101.

As the substrate 1101, an insulating substrate, a conductive substrate, or a semiconductor substrate may be used. For example, the substrate 1101 may include sapphire, SiC, Si, $MgAl_2O_4$, MgO, $LiAlO_2$, $LiGaO_2$, GaN, AlN, or AlGaN. Among them, a sapphire substrate, a silicon carbide (SiC) substrate, or the like, may be used as a heterogeneous substrate. In the case of the sapphire substrate, the sapphire is a crystal having Hexa-Rhombo R3c symmetry, lattice constants in c-axis and a-axis directions of the sapphire crystal are approximately 13.001 Å and 4.758 Å, respectively, and the sapphire crystal has a C-plane (0001), an A-plane (11-20), an R-plane (1-102), or the like.

In this case, a nitride thin film may be grown on the C-plane of the sapphire crystal. In addition, since the sapphire crystal is stable at high temperatures, the sapphire substrate may be used as a nitride growth substrate.

In addition, a silicon (Si) substrate may also be employed as a heterogeneous substrate. Since the Si substrate is appropriate for increasing a diameter and is relatively low in price, the Si substrate may be used to facilitate mass-production. A difference in lattice constants between the silicon substrate, having a (111) plane as a substrate surface, and GaN is about 17%, and thus, a technique of suppressing crystal defects due to the difference between the lattice constants may be used. In addition, a difference in coefficients of thermal expansion between silicon and GaN is approximately 56%, and thus, a technique of suppressing bowing of a wafer generated due to the difference in the coefficients of thermal expansion may be used. Bowed wafers may result in cracks in the GaN thin film and make it difficult to control processes to increase dispersion of emission wavelengths of light in the same wafer, or the like. The Si substrate absorbs light generated in GaN-based semiconductor and thus, external quantum efficiency of the LED may be lowered. Thus, the substrate 1101 may be removed and a support substrate such as a silicon substrate, a germanium substrate, an SiAl substrate, a ceramic substrate, a metal substrate, or the like, including a reflective layer, may be additionally formed to be used.

The substrate 1101 of the LED employed in the exemplary embodiment of the present inventive concept is not limited to a heterogeneous substrate, and a homogeneous substrate such as GaN substrate or the like, may be used. The GaN substrate may not have high degree of mismatch with a GaN material used to form the light emitting laminate S in terms of a lattice constant and a coefficient of thermal expansion, and thus, a high quality semiconductor thin film may be grown thereon.

In the case of using a heterogeneous substrate, defects such as dislocation may be increased due to a difference in lattice constants between a substrate material and a thin film material. In addition, a difference in coefficients of thermal expansion between the substrate material and the thin film material may cause bowing of the substrate when a temperature is changed, and the bowing of the substrate may cause cracks in the thin film. The bowing and cracks of the substrate may be reduced using a buffer layer 1102 formed between the substrate 1101 and the GaN-based light emitting laminate S.

Thus, in an exemplary embodiment of the present inventive concept, the LED may further include the buffer layer 1102 formed between the substrate 1101 and the light emitting laminate S. The buffer layer 1102 may adjust a degree of bowing of the substrate when an active layer 1130 is grown, and thus, wavelength scattering of a wafer may be reduced.

Although differing according to a substrate type, the buffer layer 1102 may include $Al_xIn_yGa_{1-x-y}N$ ($0 \leq x \leq 1$, $0 \leq y \leq 1$), for example, GaN, AlN, AlGaN, InGaN, or InGaAlN. In addition, a material such as $ZrB_2$, $HfB_2$, ZrN, HfN, TiN, or the like, may be used. Also, the buffer layer 1102 may be formed by combining a plurality of layers or by gradually changing a composition.

In addition, in case of employing a silicon substrate as the substrate 1101, silicon has a coefficient of thermal expansion significantly different (for example, about 56%) from that of GaN. Thus, in case of growing a GaN-based thin film on the silicon substrate, when the GaN thin film is grown at a high temperature and is subsequently cooled to a room temperature, tensile stress may be applied to the GaN thin film due to the difference in the coefficients of thermal expansion between the silicon substrate and the GaN thin film, and thus, cracks may be generated. In this case, to prevent the generation of cracks, a method of growing the GaN thin film such that compressive stress is applied to the GaN thin film while the GaN thin film is being grown is used to compensate for tensile stress. In addition, to restrain the generation of defects due to a difference in lattice constants, the buffer layer 1102 may have a composite structure. In this case, the buffer layer 1102 may control a stress of the substrate 1101 (for example, the silicon substrate) to suppress warpage (or bowing). In addition, the buffer layer 1102 may control a defect.

For example, an AlN layer is formed as the buffer layer 1102 on the substrate 1101. In this case, a material not including gallium (Ga) may be used to prevent a reaction between silicon (Si) and gallium (Ga). The AlN layer is grown at a temperature ranging from about 400° C. to about 1,300° C. by using an aluminum (Al) source and a nitrogen (N) source. For example, an AlGaN intermediate layer may be inserted into the center of GaN between the plurality of AlN layers to control stress to form the buffer layer 1102 having a composite structure.

In addition, the substrate 1101 may be completely or partially removed or patterned during a fabrication process to enhance optical properties or electrical characteristics of the LED, before or after the light emitting laminate S is grown. For example, in the case of using the sapphire substrate, the substrate may be separated by irradiating a laser on an interface between the substrate 1101 and the buffer layer 1102 or on an interface between the substrate 1101 and the light emitting laminate S. In the case of using the silicon substrate or the silicon carbide substrate, the substrate may be removed by polishing/etching the substrate, or the like.

In addition, when removing the substrate 1101, different support substrates may be used, and in this case, to enhance light efficiency of the LED, the support substrate may be attached to the opposite side of the original growth substrate by using a reflective metal, or a reflective structure may be inserted into a middle portion of a bonding layer.

In a substrate patterning, to enhance a light extraction efficiency, an uneven surface or a sloped surface may be formed on a main surface (e.g., one surface or both surfaces) or a lateral surface of the substrate 1101, before or after the growth of the light emitting laminate S. A size of the pattern may be within a range of about 5 nm to about 500 μm. Any shape or pattern may be employed. For example, the pattern may a regular or an irregular pattern, or may include a columnar shape, a peaked shape, a hemispherical shape, a polygonal shape, or the like, as long as the pattern can enhance the light extraction efficiency.

The light emitting laminate S includes first and second conductivity-type semiconductor layers 1110 and 1120, and the active layer 1130 is interposed therebetween. The first and second conductivity-type semiconductor layers 1110 and 1120 may have a single layer structure. In addition, the first and second conductivity-type semiconductor layers 1110 and 1120 may have a multilayer structure including layers having different compositions, thicknesses, or the like. For example, the first and second conductivity-type semiconductor layers 1110 and 1120 may have a carrier injection layer for improving electron and hole injection efficiency, or may have various types of superlattice structure.

The first conductivity-type semiconductor layer 1110 may further include a current spreading layer in a region adjacent to the active layer 1130. The current spreading layer may have a structure in which a plurality of $In_xAl_yGa_{(1-x-y)}N$ layers having different compositions or different impurity contents are iteratively laminated. The spreading layer may have an insulating material layer partially formed therein.

The second conductivity-type semiconductor layer 1120 may further include an electron blocking layer in a region adjacent to the active layer 1130. The electron blocking layer may have a structure in which a plurality of $In_xAl_yGa_{(1-x-y)}N$ layers having different compositions are laminated, or may have one or more layers including $Al_yGa_{(1-y)}N$. The electron blocking layer has a bandgap greater than that of the active layer 1130, thus preventing electrons from being transferred to the second conductivity-type (e.g., p-type) semiconductor layer 1120.

The light emitting laminate S may be formed by using metal-organic chemical vapor deposition (MOCVD). To fabricate the light emitting laminate S, an organic metal compound gas (e.g., trimethyl gallium (TMG), trimethyl aluminum (TMA)) and a nitrogen-containing gas (e.g., ammonia ($NH_3$), or the like) are supplied to a reaction container in which the substrate 1101 is installed as reactive gases, the substrate 1101 is maintained at a high temperature ranging from about 900° C. to about 1,100° C., and when a gallium nitride-based compound semiconductor is being grown, an impurity gas may be supplied to laminate the gallium nitride-based compound semiconductor as an undoped n-type or p-type semiconductor. The n-type impurity includes Silicon (Si). The P-type impurities include zinc (Zn), cadmium (Cd), beryllium (Be), magnesium (Mg), calcium (Ca), barium (Ba), or the like. For example, the magnesium (Mg) and zinc (Zn) are commonly used.

In addition, the active layer 1130 disposed between the first and second conductivity-type semiconductor layers 1110 and 1120 may have a multi-quantum well (MQW) structure in which quantum well layers and quantum barrier layers are alternately laminated. For example, in the case of a nitride semiconductor, a GaN/InGaN structure may be used, or a single quantum well (SQW) structure may also be used.

In an exemplary embodiment of the present inventive concept, an ohmic-contact layer 1120b may be formed on the second conductivity-type semiconductor layer 1120. The ohmic-contact layer 1120b may have a relatively high impurity concentration to have a low ohmic-contact resistance to lower an operating voltage of an element and to enhance element characteristics. The ohmic-contact layer 1120b may include a GaN layer, an InGaN layer, a ZnO layer, a graphene layer, or the like.

Referring back to FIG. 12, the LED includes first and second electrodes 1110a and 1120a electrically connected to the first and second conductivity-type semiconductor layers 1110 and 1120, respectively. The first and second electrodes 1110a and 1120a may include a material such as silver (Ag), nickel (Ni), aluminum (Al), rhodium (Rh), palladium (Pd), iridium (Ir), ruthenium (Ru), magnesium (Mg), zinc (Zn), platinum (Pt), gold (Au), or the like, and may have a structure including two or more layers such as Ni/Ag, Zn/Ag, Ni/Al, Zn/Al, Pd/Ag, Pd/Al, Ir/Ag, Ir/Au, Pt/Ag, Pt/Al, Ni/Ag/Pt, or the like.

In an exemplary embodiment of the present inventive concept, the LED illustrated in FIG. 12 may have a structure in which the first and second electrodes 1110a and 1120a face in the same direction as that of a light extraction surface. However, the first and second electrodes 1110a and 1120a may be mounted to face in a direction opposite to the light extraction surface in a flip-chip structure.

Figure 13:
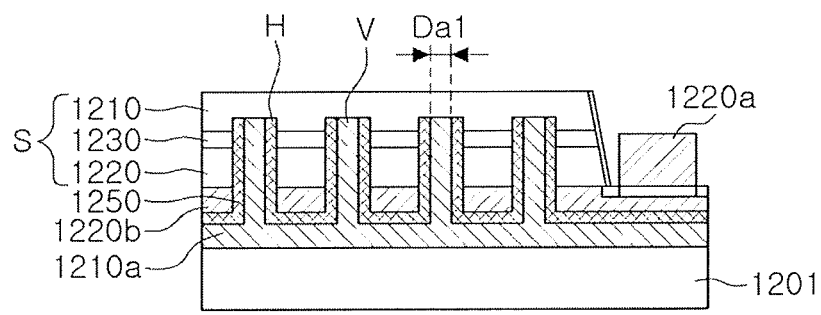

In an LED according to an exemplary embodiment of the present inventive concept as illustrated in FIG. 13, a current spreading efficiency and a heat dissipation efficiency may be enhanced, and a large LED having a high output intensity may be obtained.

Referring to FIG. 13, the LED according to the exemplary embodiment of the present inventive concept may include a light emitting laminate S, a second electrode layer 1220b, an insulating layer 1250, a first electrode layer 1210a, and a substrate 1201. The light emitting laminate S includes a first conductivity-type semiconductor layer 1210, an active layer 1230, and a second conductivity-type semiconductor layer 1220 which are sequentially laminated. Here, to be electrically connected to the first conductivity-type semiconductor layer 1210, the first electrode layer 1210a includes one or more contact holes H which extend from one surface of the first electrode layer 1210a to at least a partial region of the first conductivity-type semiconductor layer 1210 and are electrically insulated from the second conductivity-type semiconductor layer 1220 and the active layer 1230. However, the first electrode layer 1210a might not be included.

The contact hole H may extend from an interface of the first electrode layer 1210a, passing through the second electrode layer 1220b, the second conductivity-type semiconductor layer 1220, and the active layer 1230, to the interior of the first conductivity-type semiconductor layer 1210. The contact hole H may extend at least to an interface between the active layer 1230 and the first conductivity-type semiconductor layer 1210. For example, the contact hole H may extend to a portion of the first conductivity-type semiconductor layer 1210. Since, the contact hole H may be formed for electrical connectivity and current spreading of the first conductivity-type semiconductor layer 1210, the presence of the contact hole H may be achieved when the contact hole H is in contact with the first conductivity-type semiconductor layer 1210. Thus, the contact hole H may not need to extend to an external surface of the first conductivity-type semiconductor layer 1210.

The second electrode layer 1220b formed on the second conductivity-type semiconductor layer 1220 may selectively include a material such as silver (Ag), nickel (Ni), aluminum (Al), rhodium (Rh), palladium (Pd), iridium (Ir), ruthenium (Ru), magnesium (Mg), zinc (Zn), platinum (Pt), gold (Au), or the like, in consideration of a light reflecting function and an ohmic-contact function with the second conductivity-type semiconductor layer 1220. The second conductivity-type semiconductor layer 1220 may be formed by using a process such as sputtering, deposition, or the like. A second electrode pad 1220a may be disposed on the second electrode layer 1220b.

The contact hole H may penetrate the second electrode layer 1220b, the second conductivity-type semiconductor layer 1220, and the active layer 1230 to be connected to the first conductivity-type semiconductor layer 1210. The contact hole H may be formed through an etching process, e.g., inductively coupled plasma-reactive ion etching (ICP-RIE), or the like.

The insulating layer 1250 is formed to cover a side wall of the contact hole H and a surface of the second conductivity-type semiconductor layer 1220. In this case, at least a portion of the first conductivity-type semiconductor layer 1210 corresponding to a lower surface of the contact hole H may be exposed. The insulating layer 1250 may be formed by depositing an insulating material such as $SiO_2$, $SiO_xN_y$, $Si_xN_y$, or the like.

The first electrode layer 1210a including a conductive via V formed by filling a conductive material is formed within the contact hole H. Subsequently, the substrate 1201 is formed on the first electrode layer 1210a. In this structure, the substrate 1201 may be electrically connected by the conductive via V connected to the first conductivity-type semiconductor layer 1210.

The substrate 1201 may have a material including any one of Au, Ni, Al, Cu, W, Si, Se, GaAs, SiAl, Ge, SiC, AlN, $Al_2O_3$, GaN, AlGaN, or the like, and may be formed through a process such as plating, sputtering, deposition, bonding, or the like. However, the present inventive concept is not limited thereto.

To reduce a contact resistance, the number, a shape, a pitch of the contact hole H, a contact area of the contact hole H with the first and second conductivity-type semiconductor layers 1210 and 1220, or the like may be appropriately regulated. The contact holes H may be arranged to have various shapes in rows and columns to improve current flow. In this case, the conductive via may be surrounded by the insulating layer 1250 to be electrically separated from the active layer 1230 and the second conductivity-type semiconductor layer 1220.

The number of vias V and a contact area of the vias V with the first conductivity-type semiconductor may be adjusted so that the area of the vias V in rows and columns occupying the plane of the regions in which the vias V are in contact with the first conductivity-type semiconductor ranges from about 1% to about 5% of the planar area of the light emitting laminate S. A radius (e.g., half (½) of the diameter Da1) of the via V may range, for example, from about 5 μm to about 50 μm, and the number of vias V may be 1 to about 50 per light emitting device region according to a width of the light emitting region. Although different according to a width of the light emitting device region, for example, two or more vias may be provided. A distance between the vias V may range from about 100 μm to about 500 μm, and the vias V may have a matrix structure including rows and columns. For example, the distance between the vias V may range from about 150 μm to about 450 μm. When the distance between the vias V is smaller than 100 μm, the number of vias V is increased to reduce a light emitting area and to lower a luminous efficiency. When the distance between the vias V is greater than 500 μm, current spreading suffers to lower the luminous efficiency. A depth of the conductive via V may range from about 0.5 μm to about 5.0 μm. The depth of the conductive via V may vary according to a thickness of the second conductivity-type semiconductor layer 1220 and the active layer 1230.

Figure 14:
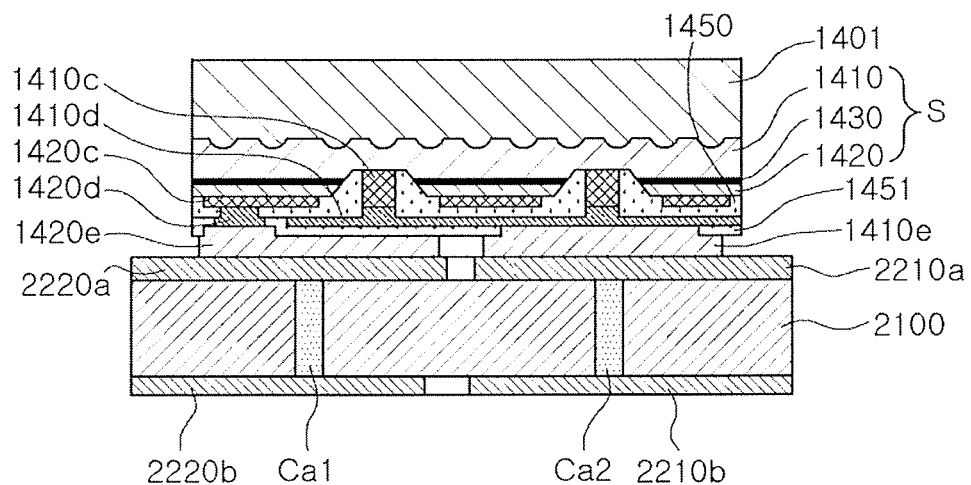

Referring to FIG. 14, an LED according to an exemplary embodiment of the present inventive concept may include a light emitting laminate S disposed in one surface of a substrate 1401 and first and second electrodes 1410c and 1420c disposed on the opposite side of the substrate 1410 based on the light emitting laminate S. In addition, the LED may include an insulating unit 1450 for covering the first and second electrodes 1410c and 1420c. The first and second electrodes 1410c and 1420c may be electrically connected to first and second electrode pads 1410e and 1420e through electrical connection units 1410d and 1420d.

The light emitting laminate S may include a first conductivity-type semiconductor layer 1410, an active layer 1430, and a second conductivity-type semiconductor layer 1420 which are sequentially disposed on the substrate 1401. The first electrode 1410c may be provided as a conductive via connected to the first conductivity-type semiconductor layer 1410 through the second conductivity-type semiconductor layer 1420 and the active layer 1430. The second electrode 1420c may be connected to the second conductivity-type semiconductor layer 1420.

The insulating unit 1450 has an open area exposing at least portions of the first and second electrodes 1410c and 1420c, and the first and second electrode pads 1410e and 1420e may be connected to the first and second electrodes 1410c and 1420c.

The first and second electrodes 1410c and 1420c may include a conductive material having ohmic characteristics with respect to the first conductivity-type semiconductor layers 1410 and 1420, respectively, and may have a single layer structure or a multilayer structure. For example, the first and second electrodes 1410c and 1420c may be formed by depositing or sputtering one or more of silver (Ag), aluminum (Al), nickel (Ni), chromium (Cr), a transparent conductive oxide (TCO), or the like. The first and second electrodes 1410c and 1420c may be disposed in the same direction and may be mounted as a so-called flip-chip on a lead frame, or the like, as described hereinafter. In this case, the first and second electrodes 1410c and 1420c may be disposed to face in the same direction.

For example, the first electrode 1410c may have a conductive via V connected to the first conductivity-type semiconductor layer 1410 through the second conductivity-type semiconductor layer 1420 and the active layer 1430 within the light emitting laminate S, and may be electrically connected to a first electrical connection unit 1410d.

The LED may include the second electrode 1420c directly formed on the second conductivity-type semiconductor layer 1420 and a second electrical connection unit 1420d formed on the second electrode 1420c. In addition to having the function of forming an electrical-ohmic connection with the second conductivity-type semiconductor layer 1420, the second electrode 1420c may include a light reflective material by which light emitted from the active layer 1430 may be toward the substrate 1401 when the LED is mounted as a so-called flip chip structure, as illustrated in FIG. 14. In an exemplary embodiment of the present inventive concept, the second electrode 1420c may include a light-transmissive conductive material such as a transparent conductive oxide, according to a main light emitting direction.

In addition, on the basis of the second conductivity-type semiconductor layer 1420, an ohmic-electrode of an Ag layer may be laminated as the second electrode 1420c. For example, the second electrode 1420c may be formed by laminating the ohmic-electrode of the Ag layer on the second conductivity-type semiconductor layer 1420. The Ag ohmic-electrode may serve as a light reflective layer. A single layer of nickel (Ni), titanium (Ti), platinum (Pt), or tungsten (W), or an alloy layer thereof may be alternately laminated on the Ag layer. For example, Ni/Ti layers, TiW/Pt layers, or Ti/W layers may be laminated or these layers may be alternately laminated on the Ag layer. As for the first electrode 1410c, on the basis of the first conductivity-type semiconductor layer 1410, a chromium (Cr) layer may be laminated and Au/Pt/Ti layers may be sequentially laminated on the Cr layer. For example, the first electrode 1410c may be formed by laminating the chromium (Cr) layer on the first conductivity-type semiconductor layer 1410 and laminating sequentially the Au/Pt/Ti layers on the Cr layer. In an exemplary embodiment of the present inventive concept, an Al layer may be laminated on the first conductivity-type semiconductor layer 1410 and Ti/Ni/Au layers may be sequentially laminated on the Al layer.

To enhance ohmic characteristics or reflecting characteristics, the first and second electrodes 1410c and 1420c may employ various materials or lamination structures other than those of the foregoing exemplary embodiments.

The two electrode structures as described above may be electrically separated by the insulating unit 1450. The insulating unit 1450 may include any material as long as it has electrically insulating properties. For example, a material having a low degree of light absorption may be used. For example, a silicon oxide or a silicon nitride such as $SiO_2$, $SiO_xN_y$, $Si_xN_y$, or the like, may be used. A light reflective filler may be dispersed in the light-transmissive material to form a light reflective structure.

The first and second electrode pads 1410e and 1420e may be connected to the first and second electrical connection units 1410d and 1420d to serve as external terminals of the LED, respectively. Here, an insulating material layer 1451 may be disposed in partial regions between the first and second electrical connection units 1410d and 1420d and the first and second electrode pads 1410e and 1420e. The first and second electrode pads 1410e and 1420e may include gold (Au), silver (Ag), aluminum (Al), titanium (Ti), tungsten (W), copper (Cu), tin (Sn), nickel (Ni), platinum (Pt), chromium (Cr), NiSn, TiW, AuSn, or a eutectic metal thereof. In this case, when the LED is mounted on the substrate 1401, the first and second electrode pads 1410e and 1420e may be bonded using the eutectic metal and thus, solder bumps generally required for flip chip bonding may not be used. The use of a eutectic metal in the mounting method may obtain better heat dissipation than the use of solder bumps. In this case, to increase the heat dissipation, the first and second electrode pads 1410e and 1420e may be formed to occupy a relatively large area.

In addition, a buffer layer may be formed between the light emitting structure S and the substrate 1401. The buffer layer may be employed as an undoped semiconductor layer including a nitride, or the like, to alleviate lattice defects in the light emitting structure grown thereon.

In an exemplary embodiment of the present inventive concept, the substrate 1401 may have first and second main surfaces opposing one another, and an uneven structure (e.g., a depression and protrusion pattern) may be formed on at least one of the first and second main surfaces. The uneven structure formed on one surface of the substrate 1401 may be formed by etching a portion of the substrate 1401. The uneven structure may be formed of the same material as that of the substrate 1401. In addition, the uneven structure may be formed of a heterogeneous material different from that of the substrate 1401.

In an exemplary embodiment of the present inventive concept, since the uneven structure is formed on the interface between the substrate 1401 and the first conductivity-type semiconductor layer 1410, paths of light emitted from the active layer 1430 may be diverse, and thus, a light absorption ratio of light absorbed within the semiconductor layer may be reduced and a light scattering ratio may be increased. Thus, light extraction efficiency may be increased.

For example, the uneven structure may be formed to have a regular or irregular shape. The heterogeneous material used to form the uneven structure may be a transparent conductor, a transparent insulator, or a material having a relatively high reflectivity. Here, as the transparent insulator, a material such as $SiO_2$, $SiN_x$, $Al_2O_3$, HfO, $TiO_2$, ZrO, or the like, may be used. As the transparent conductor, a transparent conductive oxide (TCO) such as ZnO, an indium oxide containing an additive (e.g., Mg, Ag, Zn, Sc, Hf, Zr, Te, Se, Ta, W, Nb, Cu, Si, Ni, Co, Mo, Cr, Sn), or the like, may be used. As the reflective material, silver (Ag), aluminum (Al), or a distributed Bragg reflector (DBR) including multiple layers having different refractive indices, may be used. However, the present inventive concept is not limited thereto.

In addition, the substrate 1401 may be removed from the first conductivity-type semiconductor layer 1410. To remove the substrate 1401, a laser lift-off (LLO) process using a laser, an etching process, or a polishing process may be used. After the substrate 1401 is removed, depressions and protrusions may be formed on the surface of the first conductivity-type semiconductor layer 1410.

As illustrated in FIG. 14, the LED is mounted on a package body 2100. The package body 2100 may be a semiconductor substrate such as a silicon (Si) substrate, an insulating substrate, a conductive substrate, or the like. Surface electrodes 2210a and 2220a and rear electrodes 2210b and 2220b are formed on upper and lower surfaces of the package body 2100, respectively. In addition, conductive vias Ca1 and Ca2 are formed to penetrate through the package body 2100 to connect the surface electrodes 2210a and 2220a and the rear electrodes 2210b and 2220b, respectively.

In an exemplary embodiment of the present inventive concept, the LED may uniformly spread current, and obtain relatively high heat dissipation in a unit of chip since a contact area between the LED and the package body is increased.

When an LED is driven, a partial amount of energy is emitted as thermal energy as well as optical energy. Thus, with a light emitting device employing an LED as a light source, heat dissipation may be considered. The light emitting module may include a heat dissipation unit such as a heat sink, or the like. In an exemplary embodiment of the present inventive concept, the heat dissipation may be increased using the LED having a low heating value. To this end, an LED including, for example, nano-structures (hereinafter, referred to as a "nano-LED") may be used.

Figure 15A:
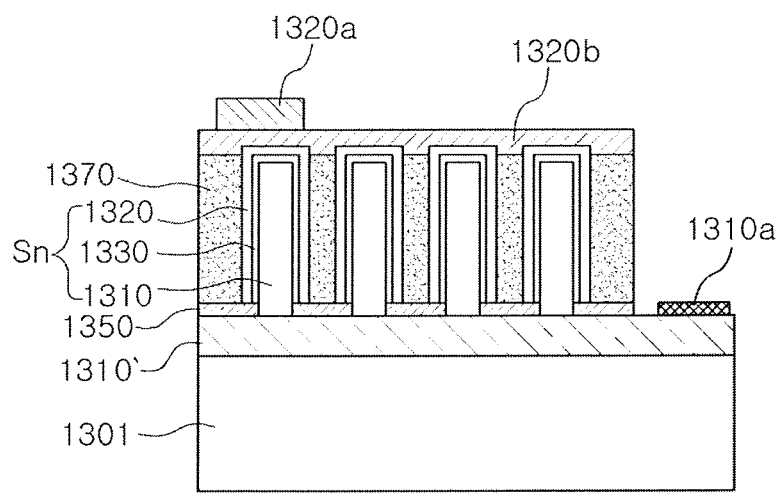

Referring to FIG. 15A, an LED includes a plurality of nano-light emitting structures Sn formed on a substrate 1301. In an exemplary embodiment of the present inventive concept, it is illustrated that the nano-light emitting structure Sn has a core-shell structure as a rod structure, but the present inventive concept is not limited thereto, and, for example, the nano-light emitting structure may have a different structure such as a pyramid structure.

The LED includes a base layer 1310' formed on the substrate 1301. The base layer 1310' is a layer providing a growth surface for the nano-light emitting structure Sn, and the base layer 1310' may be a first conductivity-type semiconductor layer. A mask layer 1350 having an open area for the growth of the nano-light emitting structure (e.g., a core) may be formed on the base layer 1310'. The mask layer 1350 may include a dielectric material such as $SiO_2$, $SiN_x$, or the like.

In the nano-light emitting structure Sn, a first conductivity-type nanocore 1310 is formed by selectively growing a first conductivity-type semiconductor by using the mask layer 1350 having the open area. An active layer 1330 and a second conductivity-type semiconductor layer 1320 are formed as shell layers on a surface of the nanocore 1310. Accordingly, the nano-light emitting structure Sn may have a core-shell structure in which the first conductivity-type semiconductor is the nanocore and the active layer 1330 and the second conductivity-type semiconductor layer 1320 enclosing the nanocore are shell layers.

The LED includes a filler material 1370 filling spaces between the nano-light emitting structures Sn. The filler material 1370 may structurally stabilize the nano-light emitting structures Sn. The filler material 1370 may include a transparent material such as $SiO_2$, SiN, a silicone resin, or the like, or a reflective material such as polymer (Nylon), PPA, PCE, silver (Ag), aluminum (Al), or the like. However, the present inventive concept is not limited thereto. An ohmic-contact layer 1320b may be formed on the nano-light emitting structures Sn and connected to the second conductivity-type semiconductor layer 1320. The LED includes first and second electrodes 1310a and 1320a connected to the base layer 1310', which is formed of the first conductivity-type semiconductor, and the ohmic-contact layer 1320b, respectively.

By forming the nano-light emitting structures Sn such that they have different diameters, components, and doping densities, light having two or more different wavelengths may be emitted from a single device. By appropriately adjusting light having different wavelengths, white light may be implemented in the single device without using phosphors. In addition, light having various desired colors or white light having different color temperatures may be implemented by combining the foregoing device with a different LED or wavelength conversion materials such as phosphors.

The LED using the nano-light emitting structures Sn may increase a luminous efficiency by increasing a light emitting area by utilizing the nano-structures, and may prevent a degradation of efficiency due to polarization by obtaining a non-polar active layer, thus improving droop characteristics.

FIGS. 15B through 15E are cross-sectional views illustrating major processes of forming nano-light emitting structures Sn using a mask 1352 according to an exemplary embodiment of the present inventive concept.

Figure 15B:
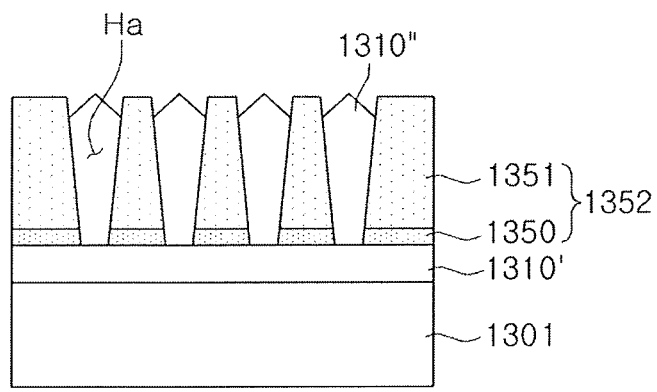

As illustrated in FIG. 15B, nanocores 1310" may be grown on a base layer 1310' using the mask 1352. The mask 1352 includes a first material layer 1350, a second material layer 1351, and openings Ha having a width decreased toward a lower portion thereof.

The first material layer 1350 and the second material layer 1531 may be formed of different materials to secure a desired difference in etching rates. For example, the first material layer 1350 may be formed of SiN and the second material layer 1351 may be formed of $SiO_2$. In addition, for example, the second material layer 1351 or both the first and second material layers 1350 and 1351 are formed of a material having a porous structure to secure a difference in etching rates based on differences in porosity thereof. In this case, the first and second material layers 1350 and 1351 may be formed of the same material but have different porosity.

The nanocores 1310" may be grown to have a shape corresponding to that of the openings Ha.

To further enhance crystal quality of the nanocores 1310", a heat treatment process may be performed one or more times during the growth of the nanocores 1310". For example, a portion of a top surface of each nanocore 1310" may be rearranged to have a hexagonal pyramidal crystal face, and thus, a stable crystal structure and a high quality of a crystal grown in a follow-up process may be obtained.

The heat treatment process may be performed, for example, at a temperature equal or similar to the growth temperature of the nanocores 1310", for process convenience. In addition, the heat treatment process may be performed in a manner of stopping a metal source such as TMGa and maintaining a pressure and a temperature equal or similar to the growth pressure and temperature of the nanocores 1310". The heat treatment process may be continued for a few seconds to tens of minutes (for example, 5 seconds to 30 minutes). In addition, for example, a sufficient effect may be obtained even with a time duration ranging from about 10 seconds to about 60 seconds.

The heat treatment process introduced during the growth process of the nanocores 1310" may prevent degeneration of crystallinity caused when the nanocores 1310" are grown at a fast speed, and thus, a fast crystal growth and a high crystal quality may be achieved due to the heat treatment process.

A time duration and the number of the heat treatment process for stabilization may be variously modified according to a height and diameter of final nanocores 1310". For example, when a width of each opening Ha ranges from about 300 nm to about 400 nm and a height of each opening H (e.g., a thickness of the mask 1352) is approximately 2.0 μm, a stabilization time duration ranging from approximately 10 seconds to 60 seconds may be inserted at a middle point(e.g., approximately 1.0 μm) in the height direction of each opening H to grow cores having a desired high quality. The stabilization process may be omitted according to core growth conditions.

Figure 15C:
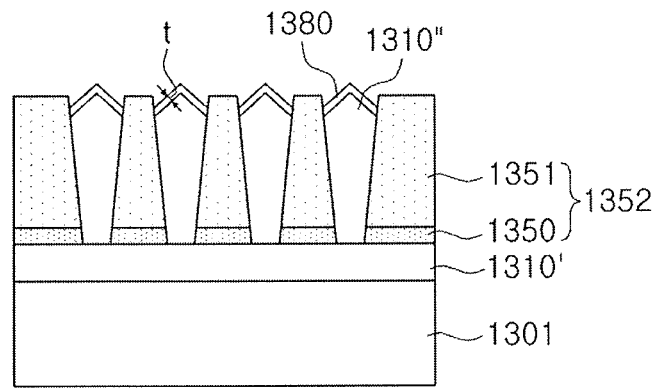

In addition, as illustrated in FIG. 15C, a current suppression intermediate layer 1380, for example, a highly resistive layer, may be formed on top portions of the nanocores 1310".

After the nanocores 1310" are formed to have a desired height, the current suppression intermediate layer 1380 may be formed on the surfaces of the top portions of the nanocores 1310" with the mask 1352 retained as is. Thus, the current suppression intermediate layer 1380 may be easily formed in the desired regions (the surfaces of the tip portions) of the nanocores 1310" without forming an additional mask.

The current suppression intermediate layer 1380 may be a semiconductor layer not doped or may be a semiconductor layer doped with a second conductivity-type impurity opposite to that of the nanocores 1310". For example, in a case in which the nanocores 1310" are n-type GaN, the current suppression intermediate layer 1380 may be undoped GaN or GaN doped with magnesium (Mg) as a p-type impurity. In this case, by changing types of an impurity during the same growth process, the nanocores 1310" and the current suppression intermediate layer 1380 may be continuously formed. For example, under the same conditions as those of the growth of the n-type GaN nanocores, in case of stopping silicon (Si) doping, injecting magnesium (Mg), and growing the same for approximately 1 minute, the current suppression intermediate layer 1380 having a thickness ranging from approximately 200 nm to 300 nm may be formed, and such a current suppression intermediate layer 1380 may effectively block a leakage current of a few μA or more. In this manner, the current blocking intermediate layer may be simply formed during the mold-type process as illustrated in FIG. 15C.

Figure 15D:
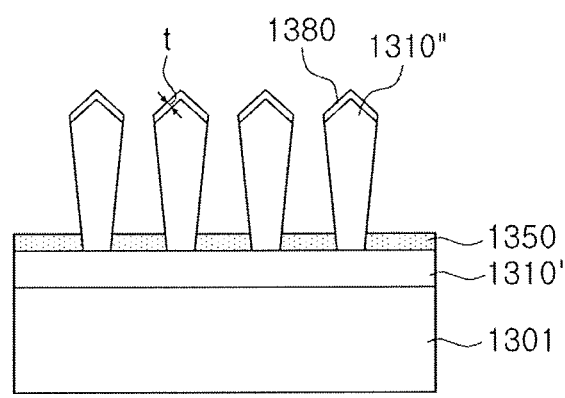

Subsequently, as illustrated in FIG. 15D, portions of the mask layer 1352 are removed up to the first material layer 1350, for example, an etch-stop layer, to expose lateral surfaces of the nanocores 1310".

In an exemplary embodiment of the present inventive concept, by applying the etching process of selectively removing the second material layer 1351, only the second material layer 1351 may be removed and the first material layer 1350 may remain. The residual first material layer 1350 may serve to prevent the active layer and the second conductivity-type semiconductor layer from being connected to the base layer 1310' in a follow-up growth process.

In an exemplary embodiment of the present inventive concept, an additional heat treatment process may be introduced during the process of forming the nano-light emitting structures using the mask having openings Ha as a mold to enhance a crystallinity.

Figure 15E:
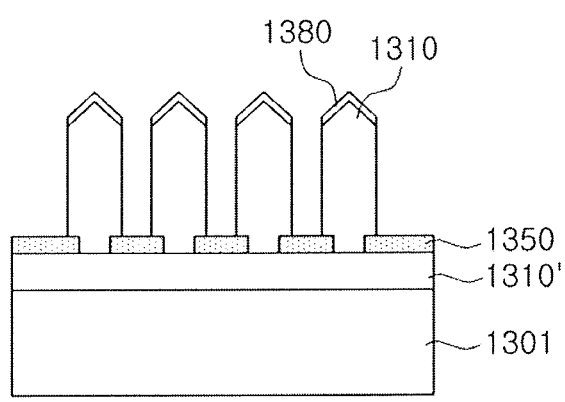

After the second material layer 1351 of the mask 1352 is removed, the surfaces of the nanocores 1310" may be heat-treated under predetermined conditions to change unstable crystal faces of the nanocores 1310" into stable crystal faces. For example, in an exemplary embodiment of the present inventive concept, since the nanocores 1310" are grown on the openings Ha having sloped side walls, the nanocores 1310" may have the sloped side walls corresponding to the shape of the openings Ha, but as illustrated in FIG. 15E, after the heat treatment process is performed, crystals are rearranged and regrown and thus, the nanocores 1310" may have a substantially uniform diameter (or width). In addition, the top portions of the nanocores 1310" immediately after being grown may have an incomplete hexagonal pyramidal shape, but the nanocores 1310" after the heat treatment process may have a hexagonal pyramidal shape having uniform surfaces (e.g., the uniform diameter (or width)). In this manner, the nanocores having a non-uniform width after the removal of the mask 1351 may be regrown and rearranged through the heat treatment process to have a hexagonal pyramidal columnar structure having a uniform width.

In addition, LEDs having various structures other than the LED as described above may be used in the light emitting device according to an exemplary embodiment of the present inventive concept. For example, an LED in which surface-plasmon polaritons (SPP) is formed in a metal-dielectric interface to interact with a quantum well exciton, thus increasing a light extraction efficiency, may also be used.

Figure 16:
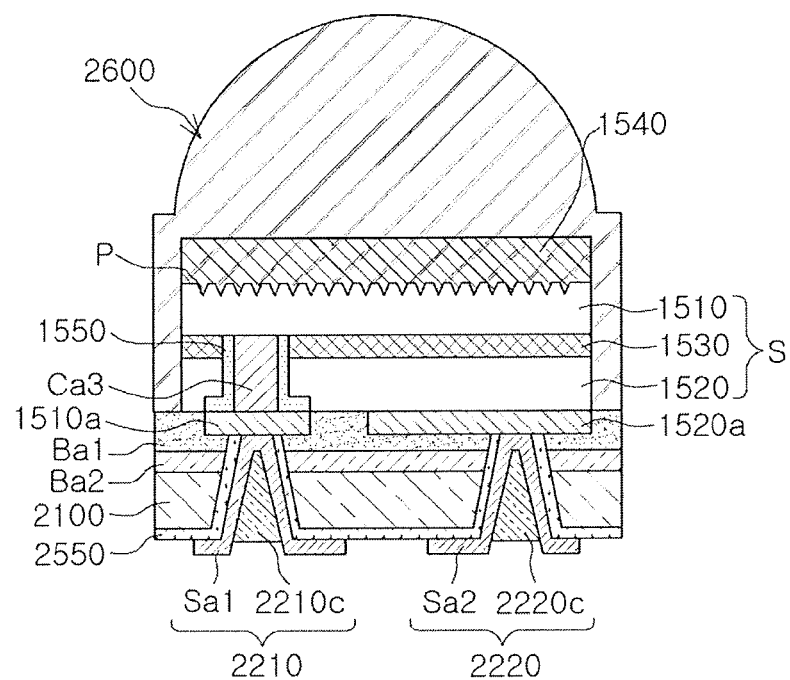

FIG. 16 illustrates an LED implemented as a so-called a "chip scale package (CSP)", as an LED according to an exemplary embodiment of the present inventive concept.

For example, referring to FIG. 16, the LED according to an exemplary embodiment of the present inventive concept may include a light emitting laminate S, a package body 2100 having first and second electrode structures 2210 and 2220, and a lens 2600 disposed above the package body 2100.

The package body 2100 may have two or more conductive vias. The package body 2100 may be a silicon (Si) substrate, a conductive support substrate, or an insulating support substrate. The conductive vias are connected to a first electrode 1510a and a second electrode 1520a of the light emitting laminate S.

The light emitting laminate S has a lamination structure including first and second conductivity-type semiconductor layers 1510 and 1520 and an active layer 1530 disposed therebetween. In an exemplary embodiment of the present inventive concept—the first and second conductivity-type semiconductor layers 1510 and 1520 may be p-type and n-type semiconductor layers, respectively, and may include a nitride semiconductor, e.g., $Al_xIn_yGa_{(1-x-y)}N$ ($0≤x≤1$, $0≤y≤1$, $0≤x+y≤1$). However, the present inventive concept is not limited thereto, and, for example, other than the nitride semiconductor, a GaAs-based semiconductor or GaP-based semiconductor may be used.

The active layer 1530 formed between the first and second conductivity-type semiconductor layers 1510 and 1520 may emit light having a predetermined intensity according to electron-hole recombination, and may have a multi-quantum well (MQW) structure in which quantum well layers and quantum barrier layers are alternately laminated. In the case of the MQW structure, for example, an InGaN/GaN or AlGaN/GaN structure may be used.

In addition, the first and second conductivity-type semiconductor layers 1510 and 1520 and the active layer 1530 may be formed using a semiconductor growth process such as metal-organic chemical vapor deposition (MOCVD), molecular beam epitaxy (MBE), hydride vapor phase epitaxy (HVPE), or the like.

The LED illustrated in FIG. 16 is in a state in which a growth substrate has been removed therefrom, and a depression and protrusion pattern P may be formed on the surface from which the growth substrate was removed.

The LED illustrated in FIG. 16 includes the first and second electrodes 1510a and 1520a connected to the first and second conductivity-type semiconductor layers 1510 and 1520, respectively. The first electrode 1510a includes a conductive via Ca3 connected to the first conductivity-type semiconductor layer 1510 through the second conductivity-type semiconductor layer 1520 and the active layer 1530. An insulating unit 1550 is formed between the conductive via Ca3 and the active layer 1530, and the conductive via Ca3 and the second conductivity-type semiconductor layer 1520 to prevent a short circuit.

In FIG. 16, a single conductive via Ca3 is illustrated, but two or more conductive vias Ca3 may be provided and arranged in various forms of rows and columns to promote current spreading.

In addition, on the basis of the second conductivity-type semiconductor layer 1520, an ohmic-electrode of an Ag layer may be laminated as the second electrode 1520a. For example, the second electrode 1520a may be formed by laminating the ohmic-electrode of the Ag layer on the second conductivity-type semiconductor layer 1520. The Ag ohmic-electrode may serve as a light reflective layer. A single layer of nickel (Ni), titanium (Ti), platinum (Pt), or tungsten (W) or an alloy layer thereof may be alternately laminated on the Ag layer. For example, Ni/Ti layers, TiW/Pt layers, or Ti/W layers may be laminated on the Ag layer or these layers may be alternately laminated on the Ag layer.

As for the first electrode 1510a, on the basis of the first conductivity-type semiconductor layer 1510, a chromium (Cr) layer may be laminated, and Au/Pt/Ti layers may be sequentially laminated on the Cr layer. For example, the first electrode 1510a may be formed by laminating the Cr layer on the first conductivity-type semiconductor layer 1510 and laminating sequentially the Au/Pt/Ti layers on the Cr layer. In an exemplary embodiment of the present inventive concept, an Al layer may be laminated on the first conductivity-type semiconductor layer 1510 and Ti/Ni/Au layers may be sequentially laminated on the Al layer.

To enhance ohmic characteristics or reflecting characteristics, the first and second electrodes 1510a and 1520a may employ various materials or lamination structures other than those of the foregoing exemplary embodiments.

Referring to FIG. 16, the package body 2100 and the LED may be bonded by bonding layers Ba1 and Ba2. The bonding layers Ba1 and Ba2 may include an electrically insulating material or an electrically conductive material. For example, the electrically insulating material may include an oxide such as $SiO_2$ and SiN, a resin material such as a silicone resin and an epoxy resin, or the like. The electrically conductive material may include silver (Ag), aluminum (Al), titanium (Ti), tungsten (W), copper (Cu), tin (Sn), nickel (Ni), platinum (Pt), chromium (Cr), NiSn, TiW, AuSn, or a eutectic metal thereof. This bonding process may be implemented by applying the first and second bonding layers Ba1 and Ba2 to respective bonding surfaces of the LED and the package body 2100 and subsequently bonding them.

A contact hole is formed from a lower surface of the package body 2100 to be connected to the first and second electrodes 1510a and 1520a of the LED. An insulator 2550 may be formed on a lateral surface of the contact hole and a lower surface of the package body 2100. In a case in which the package body 2100 is a silicon substrate, the insulator 2550 may be provided as a silicon oxide film through thermal oxidation. The contact hole includes a conductive material to form the first and second electrode structures 2210 and 2220 connected to the first and second electrodes 1510a and 1520a, respectively. The first electrode structure 2210 may include a seed layer Sa1 and a plating charged unit 2210c formed through a plating process using the seed layers Sa1. In addition, the second electrode structure 2220 may include a seed layer Sa2 and a plating charged unit 2220c formed through a plating process using the seed layers Sa2.

The chip-scale package (CSP) illustrated in FIG. 16 might not require an additional package, and thus, a size of the package may be reduced and a manufacturing process may be simplified for mass-production. In addition, an optical structure such as a lens may be integrally manufactured.

Figure 17:
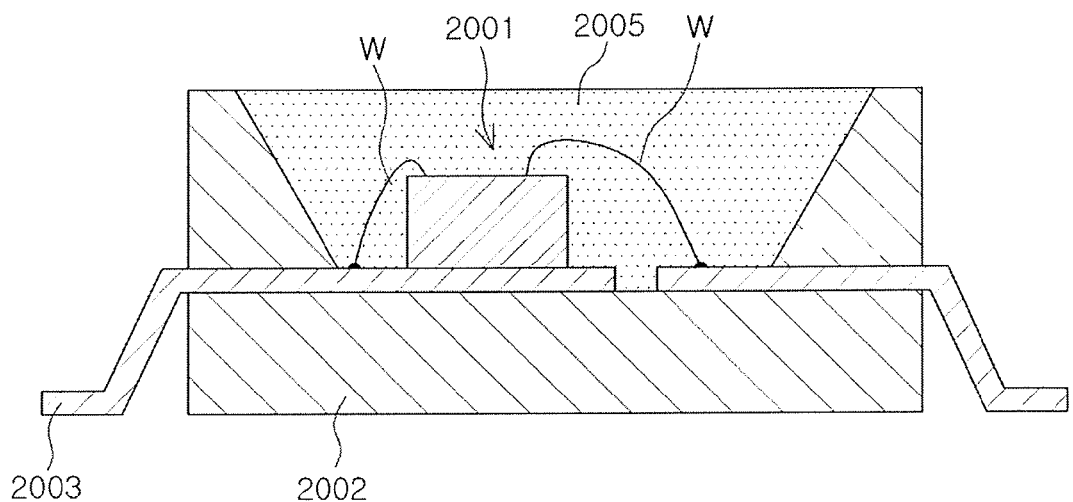
FIGS. 17 and 18 are views illustrating an example of implementing an LED package with an LED in a headlamp module according to an exemplary embodiment of the present inventive concept.
Figure 18:
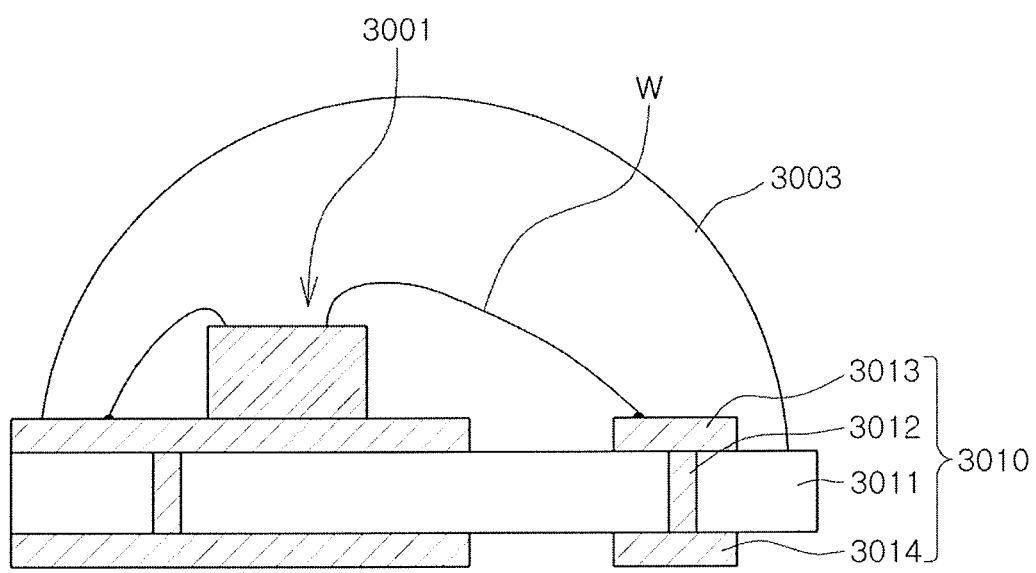

FIGS. 17 and 18 are views illustrating an example of implementing an LED package with an LED in a headlamp module according to an exemplary embodiment of the present inventive concept.

Referring to FIG. 17, an LED package may include an LED 2001, a package body 2002, and a pair of lead frames 2003. The LED 2001 may be mounted on the lead frame 2003 and electrically connected to the lead frame 2003 through a wire W. According to an exemplary embodiment of the present inventive concept, the LED 2001 may be mounted on a different region, for example, on the package body 2002, rather than on the lead frame 2003. In addition, the package body 2002 may have a cup shape to increase reflectivity efficiency of light. An encapsulator 2005 including a light-transmissive material may be formed in the reflective cup to encapsulate the LED 2001, the wire W, or the like.

Referring to FIG. 18, the LED package may include an LED 3001, a mounting board 3010, and an encapsulator 3003. A wavelength conversion material may be dispersed in the encapsulator 3003. The LED 3001 may be mounted on the mounting board 3010 and electrically connected to the mounting board 3010 through a wire W.

The mounting board 3010 may include a board body 3011, an upper electrode 3013, and a lower electrode 3014. The mounting board 3010 may include a through electrode 3012 connecting the upper electrode 3013 and the lower electrode 3014. The mounting board 3010 may be provided as a board such as PCB, MCPCB, MPCB, FPCB, or the like, and the structure of the mounting board 3010 may have various forms.

The wavelength conversion unit 3002 may include a phosphor, a quantum dot, or the like. The encapsulator 3003 may have a lens structure with an upper surface having a convex dome shape. However, according to an exemplary embodiment of the present inventive concept, the encapsulator 3003 may have a lens structure having a convex or concave surface to adjust a beam angle of light emitted through an upper surface of the encapsulator 3003.

In addition, the light emitting device may be configured to include at least one of a light emitting device that emits white light by combining yellow, green, red, and orange phosphors with a blue LED chip and purple, blue, green, red, and infrared light emitting devices. The light emitting device may emit the white light by combining yellow, green, red, and orange phosphors with a blue LED chip. In this case, the light emitting device may control a color rendering index (CRI) to range from, for example, a sodium-vapor (Na) lamp (e.g., CRI of 40) to a sunlight level (100), and a color temperature to range from about 2000K to about 20000K to generate various levels of white light. If necessary, the light emitting device may generate a visible light having purple, blue, green, red, orange colors, or infrared light to adjust an illumination color according to a surrounding atmosphere or mood. In addition, the light emitting device may generate light having a special wavelength stimulating plant growth.

Figure 19:
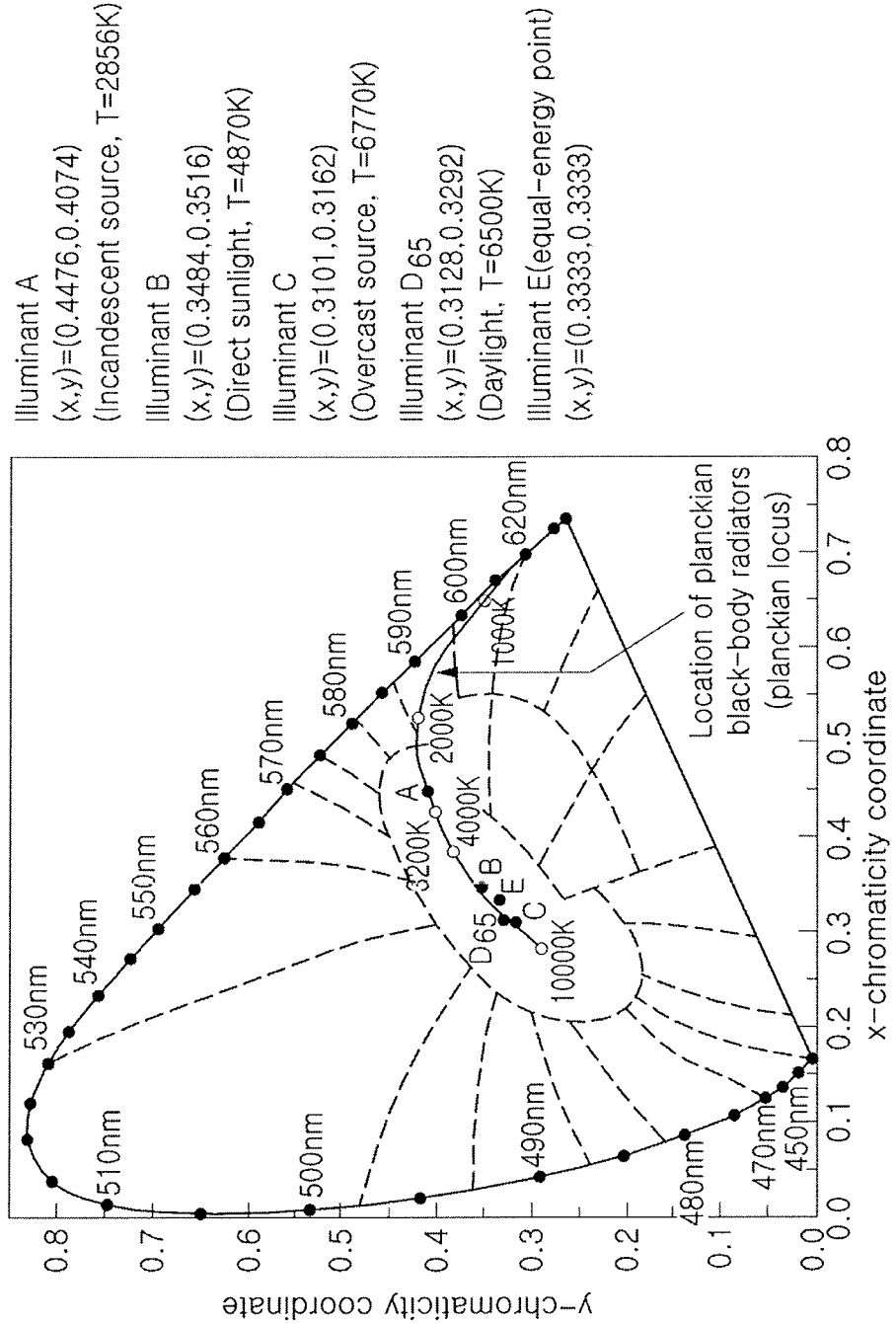
FIG. 19 is a CIE 1931 color chromaticity diagram.

White light generated by combining yellow, green, red phosphors with a blue LED, and/or combining at least one of a green LED and a red LED therewith may have two or more peak wavelengths and may be positioned in a segment linking (x, y) coordinates (0.4476, 0.4074), (0.3484, 0.3516), (0.3101, 0.3162), (0.3128, 0.3292), (0.3333, 0.3333) of a CIE 1931 chromaticity diagram illustrated in FIG. 19. In addition, the white light may be positioned in a region surrounded by a spectrum of black body radiation and the segment. A color temperature of the white light corresponds to a range from about 2000K to about 20000K.

Phosphors may have the following empirical formula and colors.

In case of oxide-based phosphors, yellow and green phosphors may include a composition of (Y, Lu, Se, La, Gd, Sm)$_3$(Ga, Al)$_5$O$_{12}$:Ce, and a blue phosphor may include a composition of BaMgAl$_{10}$O$_{17}$:Eu, 3Sr$_3$(PO$_4$)$_2$.CaCl:Eu.

In case of silicate-based phosphors, yellow and green phosphors may include a composition of (Ba, Sr)$_2$SiO$_4$:Eu, and yellow and orange phosphors may include a composition of (Ba, Sr)$_3$SiO$_5$:Eu.

In case of nitride-based phosphors, a green phosphor may include a composition of β-SiAlON:Eu, a yellow phosphor may have a composition of (La, Gd, Lu, Y, Sc)$_3$Si$_6$N$_{11}$:Ce, and an orange phosphor may have a composition of α-SiAlON:Eu. A red phosphor may include at least one of compositions among (Sr, Ca)AlSiN$_3$:Eu, (Sr, Ca)AlSi(ON)$_3$:Eu, (Sr, Ca)$_2$Si$_5$N$_8$:Eu, (Sr, Ca)$_2$Si$_5$(ON)$_8$:Eu, and (Sr, Ba)SiAl$_4$N$_7$:Eu.

In case of sulfide-based phosphors, a red phosphor may include at least one of compositions among (Sr, Ca)S:Eu and (Y, Gd)$_2$O$_2$S:Eu, and a green phosphor may include a composition of SrGa$_2$S$_4$:Eu.

In case of fluoride-based phosphors, for example, a KSF-based red phosphor may include a composition of K$_2$SiF$_6$:Mn$^{4+}$.

Phosphor compositions should be basically conformed with Stoichiometry, and respective elements may be substituted with different elements of respective groups of the periodic table. For example, strontium (Sr) may be substituted with barium (Ba), calcium (Ca), magnesium (Mg), or the like, of alkali earths. Yttrium (Y) may be substituted with terbium (Tb), Lutetium (Lu), scandium (Sc), gadolinium (Gd), or the like. In addition, europium (Eu), an activator, may be substituted with cerium (Ce), terbium (Tb), praseodymium (Pr), erbium (Er), ytterbium (Yb), or the like, according to a desired energy level, and an activator may be applied alone, or a coactivator, or the like, may be additionally applied to change characteristics.

In addition, materials such as quantum dots, or the like, may be applied as materials that replace phosphors, and the phosphors and the quantum dots may be used in combination or alone in an LED.

A quantum dot may have a structure including a core (e.g., 3 nm to 10 nm) such as CdSe, InP, or the like, a shell (e.g., 0.5 nm to 2 nm) such as ZnS, ZnSe, or the like, and a ligand for stabilizing the core and the shell, and may implement various colors according to sizes.

Table 1 below shows types of phosphors according to applications of white light emitting devices using a blue LED (e.g., wavelength: 440 nm to 460 nm).

TABLE 1

| Application | Phosphor |
| --- | --- |
| LED TV BLU | β-SiAlON:Eu$^{2+}$ |
|  | (Ca,Sr)AlSiN$_3$:Eu$^{2+}$ |
|  | L$_3$Si$_6$O$_{11}$:Ce$^{3+}$ |
|  | K$_2$SiF$_6$:Mn$^{4+}$ |
| Lighting device | Lu$_3$Al$_5$O$_{12}$:Ce$^{3+}$ |
|  | Ca-α-SiAlON:Eu$^{2+}$ |
|  | L$_3$Si$_6$N$_{11}$:Ce$^{3+}$ |
|  | (Ca,Sr)AlSiN$_3$:Eu$^{2+}$ |
|  | Y$_3$Al$_5$O$_{12}$:Ce$^{3+}$ |
|  | K$_2$SiF$_6$:Mn$^{4+}$ |
| Side Viewing (Mobile, Notebook PC) | Lu$_3$Al$_5$O$_{12}$:Ce$^{3+}$ |
|  | Ca-α-SiAlON:Eu$^{2+}$ |
|  | L$_3$Si$_6$N$_{11}$:Ce$^{3+}$ |
|  | (Ca,Sr)AlSiN$_3$:Eu$^{2+}$ |
|  | Y$_3$Al$_5$O$_{12}$:Ce$^{3+}$ |
|  | (Sr,Ba,Ca,Mg)$_2$SiO$_4$ |
|  | K$_2$SiF$_6$:Mn$^{4+}$ |
| Electrical component (headlamp, etc) | Lu$_3$Al$_5$O$_{12}$:Ce$^{3+}$ |
|  | Ca-α-SiAlON:Eu$^{2+}$ |
|  | L$_3$Si$_6$N$_{11}$:Ce$^{3+}$ |
|  | (Ca,Sr)AlSiN$_3$:Eu$^{2+}$ |
|  | Y$_3$Al$_5$O$_{12}$:Ce$^{3+}$ |
|  | K$_2$SiF$_6$:Mn$^{4+}$ |

Phosphors or quantum dots may be applied by using at least one of a method of spraying them on a light emitting device, a method of covering as a film, and a method of attaching as a sheet of ceramic phosphor, or the like.

As the spraying method, dispensing, spray coating, or the like, is used. The dispensing includes a pneumatic method and a mechanical method such as a screw fastening scheme, a linear type fastening scheme, or the like. Through a jetting method, an amount of dotting may be controlled through a small amount of discharging, and color coordinates (e.g., chromaticity) may be controlled therethrough. In the case of a method of collectively applying phosphors on a wafer level or on a mounting board on which an LED is mounted, productivity can be enhanced and a thickness can be easily controlled.

The method of directly covering a light emitting device with phosphors or quantum dots as a film may include electrophoresis, screen printing, or a phosphor molding method, and these methods may be used differently according to whether a lateral surface of a chip is to be coated or not.

To control an efficiency of a long wavelength light emitting phosphor that re-absorbs light emitted in a short wavelength, among two types of phosphors having different light emitting wavelengths, two types of phosphor layer having different light emitting wavelengths may be provided. To minimize re-absorption and interference of chips and two or more types of phosphors, a DBR (ODR) layer may be included between respective layers. To form a uniformly coated film, a phosphor may be fabricated as a film or a ceramic form, and the phosphor may be attached to a chip or a light emitting device.

To differentiate light efficiency and light distribution characteristics, a light conversion material may be positioned in a remote form, and in this case, the light conversion material may be positioned together with a material such as a light-transmissive polymer, glass, or the like, according to durability and heat resistance.

A phosphor applying technique plays a role in determining light characteristics in an LED device, so techniques of controlling a thickness of a phosphor application layer, a uniform phosphor distribution, and the like, have been variously researched.

A quantum dot (QD) may also be positioned in a light emitting device in the same manner as that of a phosphor, and may be positioned in glass or a light-transmissive polymer material to perform optical conversion.

As set forth above, according to exemplary embodiments of the present inventive concept, influence of light emitted from an oncoming vehicle, while driving a vehicle, may be minimized, and thus, an appropriate FOV may be secured for safe driving. While the present inventive concept has been shown and described with reference to exemplary embodiments thereof, it will be apparent to those skilled in the art that various modifications in forms and details may be made therein without departing from the spirit and scope of the present inventive concept as defined by the appended claims.

What is claimed is:

1. A lighting system for a vehicle, the lighting system comprising:
a sensor module configured to sense light entering from outside of the vehicle to generate a first sensing signal;
a control module configured to generate a shutter operation signal and a lighting operation signal based on the first sensing signal;
a shutter glass configured to be opened and closed according to the shutter operation signal; and
a headlamp module having a light source unit, wherein the light source unit is configured to alternately emit a first light having a first luminance and a second light having a second luminance according to the lighting operation signal,
wherein the control module is configured to control the shutter operation signal and the lighting operation signal to enable the light source unit to alternately emit the first light and the second light in synchronization with the opening and closing operations of the shutter glass.

2. The lighting system of claim 1, wherein the control module comprises:
a signal generating unit configured to generate the shutter operation signal and the lighting operation signal; and
a calculation unit configured to determine duty cycles and periods of the shutter and lighting operation signals.

3. The lighting system of claim 2, wherein the calculation unit is configured to first determine a value corresponding to an illumination intensity of the sensed light from the first sensing signal, and to second determine the duty cycles and periods of the shutter and lighting operation signals based on the first determination.

4. The lighting system of claim 2, wherein the first sensing signal includes a square wave signal corresponding to an illumination intensity of the sensed light.

5. The lighting system of claim 4, wherein the shutter operation signal has a first level for closing the shutter glass when the first sensing signal has a logic high level, and
wherein the shutter operation signal has a second level for opening the shutter glass when the first sensing signal has a logic low level.

6. The lighting system of claim 4, wherein the calculation unit is configured to first determine a duty cycle and a period of the first sensing signal, and to second determine the duty cycles and periods of the shutter and lighting operation signals based on the first determination.

7. The lighting system of claim 6, wherein the shutter glass is opened and closed when the shutter operation signal has a logic low level and a logic high level, respectively.

8. The lighting system of claim 6, wherein the shutter glass is closed and opened when the shutter operation signal has a logic low level and a logic high level, respectively.

9. The lighting system of claim 6, wherein the light source unit is configured to emit the first light when the lighting operating signal has a logic low level, and the second light when the lighting operating signal has a logic high level, the second luminance having a higher value than that of the first luminance.

10. The lighting system of claim 6, wherein the determined duty cycles and periods of the shutter and lighting operation signals are identical to the determined duty cycle and period of the first sensing signal.

11. The lighting system of claim 1, wherein the light source unit is configured to emit the first light when the shutter glass is closed and the second light when the shutter glass is opened, the second luminance having a higher value than that of the first luminance.

12. The lighting system of claim 1, wherein the control module comprises:
a calculation unit configured to determine a value corresponding to an illumination intensity of the sensed light from the first sensing signal; and
a comparing unit configured to compare the determined value of illumination intensity with a reference value,
wherein the control module is configured to generate a shutter operation signal for opening the shutter glass when the value of illumination intensity of the sensed light is equal to or smaller than the reference value.

13. The lighting system of claim 1, wherein the shutter glass is disposed in a portion of a windscreen of the vehicle.

14. The lighting system of claim 1, wherein the shutter glass is disposed in wearable glasses.

15. The lighting system of claim 1, wherein the senor module includes first and second sensor units, the first and second sensor units being configured to sense third and fourth lights, respectively, and to generate second and third sensing signals, respectively based on the third and fourth sensed lights,
wherein the first and second sensor units are disposed in different positions from each other, and
wherein the second sensing signal having a higher value than that of the third sensing signal is determined as the first sensing signal.

16. A lighting system for a vehicle, the lighting system comprises:
- a control module configured to generate first and second square wave signals synchronized to each other;
- a shutter glass disposed within a field of view of an occupant of the vehicle, wherein the shutter glass is configured to be opened and closed according to the first square wave signal; and
- a headlamp module having a light source unit, wherein the light source unit is configured to alternately emit a first light having a first luminance and a second light having a second luminance according to the second square wave signal.

17. The lighting system of claim 16, further comprising a sensor module configured to sense light entering from outside of the vehicle to generate a sensing signal, and to output the generated sensing signal to the control module.

18. The lighting system of claim 17, wherein the sensing signal includes a third square wave signal having a first duty cycle and a first period, and
- wherein the first and second square wave signals are synchronized with the third square wave signal.

19. A lighting system for a vehicle, the lighting system comprising:
- a sensor module including first and second sensor units, wherein the first sensor unit senses a first light to generate a first sensing signal, and the second sensor unit senses a second light to generate a second sensing signal;
- a control module configured to receive the first and second sensing signals, to determine one sensing signal having a higher illumination intensity than another sensing signal between the first and second sensing signals, and to generate a shutter operation signal and a lighting operation signal based on the one sensing signal having the higher illumination intensity than another sensing signal between the first and second sensing signals;
- a shutter glass configured to be opened and closed according to the shutter operation signal; and
- a headlamp module having a light source unit, wherein the light source unit is configured to alternately emit a third light having a first luminance and a fourth light having a second luminance according to the lighting operation signal.

20. The lighting system of claim 19, wherein the first light is a light incident from a front side of the vehicle, and the second light is a light incident from a rear side of the vehicle.

\* \* \* \* \*